(12) United States Patent  
Yabuki

(10) Patent No.: US 12,141,402 B2  
(45) Date of Patent: Nov. 12, 2024

(54) DISPLAY DEVICE AND INPUT APPARATUS

(71) Applicant: Alps Alpine Co., Ltd., Tokyo (JP)

(72) Inventor: Masanori Yabuki, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/299,106

(22) Filed: Apr. 12, 2023

(65) Prior Publication Data

US 2023/0244348 A1 Aug. 3, 2023

Related U.S. Application Data

(63) Continuation of application No. PCT/JP2021/031773, filed on Aug. 30, 2021.

(30) Foreign Application Priority Data

Nov. 24, 2020 (JP) ................................. 2020-194704

(51) Int. Cl.
| | |
|---|---|
| *G06F 3/044* | (2006.01) |
| *B60K 35/00* | (2024.01) |
| *B60K 35/10* | (2024.01) |
| *B60K 35/60* | (2024.01) |

(52) U.S. Cl.
CPC .............. *G06F 3/044* (2013.01); *B60K 35/00* (2013.01); *B60K 35/10* (2024.01); *B60K 35/60* (2024.01); *B60K 2360/1434* (2024.01); *B60K 2360/332* (2024.01); *B60K 2360/77* (2024.01)

(58) Field of Classification Search
None
See application file for complete search history.

(56) References Cited

U.S. PATENT DOCUMENTS

| | | | |
|---|---|---|---|
| 10,618,408 B2 * | 4/2020 | Kawashima | ............ G09F 13/04 |
| 2011/0226595 A1 | 9/2011 | Arai et al. | |
| 2019/0293279 A1 | 9/2019 | Nakatsukasa | |

FOREIGN PATENT DOCUMENTS

| | | |
|---|---|---|
| JP | 2010-129318 A | 6/2010 |
| JP | 2014-10274 A | 1/2014 |
| JP | 2019-168571 A | 10/2019 |

* cited by examiner

*Primary Examiner* — Duane N Taylor, Jr.

(74) *Attorney, Agent, or Firm* — Harness, Dickey & Pierce, P.L.C.

(57) ABSTRACT

A display device includes a flexible member having a light-transmissive property, a plurality of first light sources disposed on a side of a first surface of the flexible member, the first light sources outputting light toward the flexible member, a skin disposed on a side of a second surface of the flexible member opposite from the first surface, the skin including a plurality of first transmission areas that transmit the light output from the plurality of first light sources and passing through the flexible member as light representing shapes of a plurality of first symbols in plan view, and a first light-shielding wall at least part of which is disposed in the flexible member, the first light-shielding wall separating a plurality of first optical paths extending from the plurality of first light sources to the plurality of first transmission areas.

36 Claims, 15 Drawing Sheets

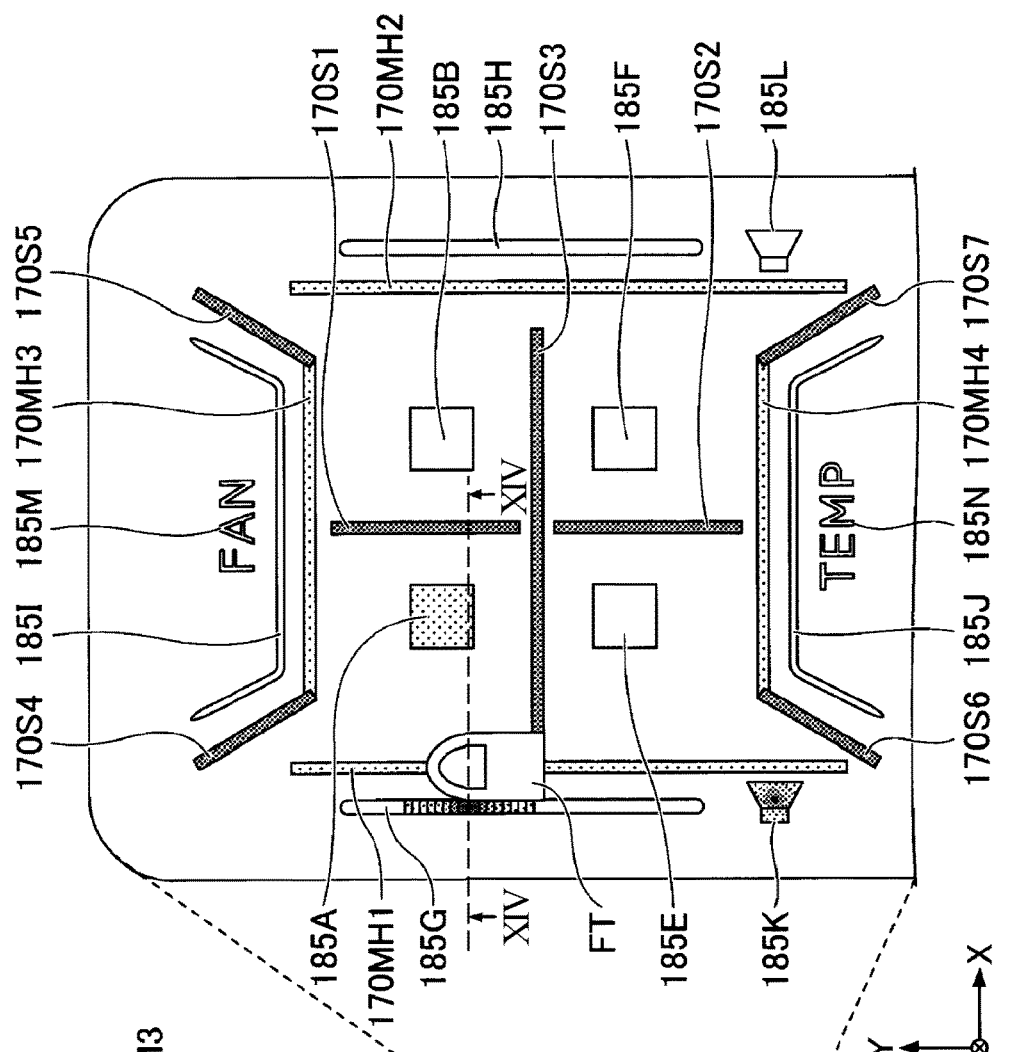
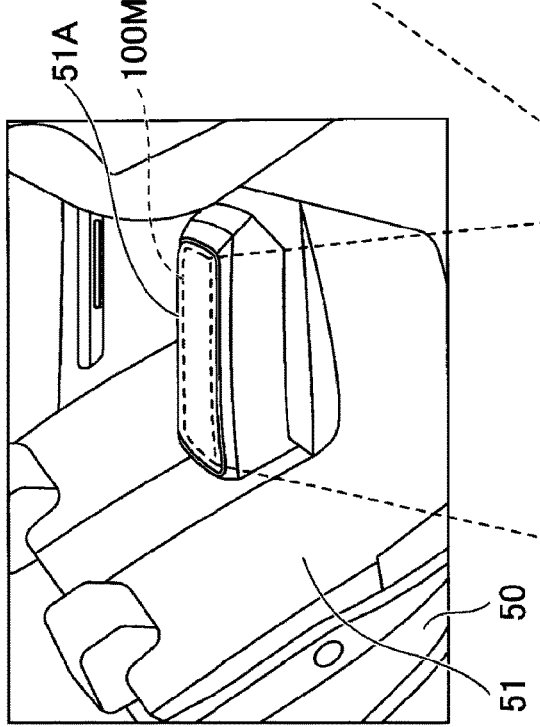
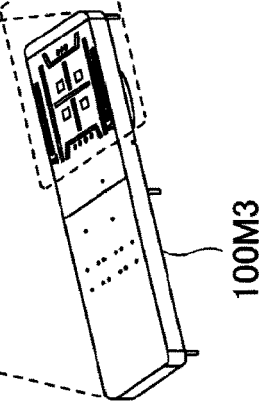

DISPLAY DEVICE AND INPUT APPARATUS

CLAIM OF PRIORITY

This application is a Continuation of International Application No. PCT/JP2021/031773 filed on Aug. 30, 2021, which claims benefit of Japanese Patent Application No. 2020-194704 filed on Nov. 24, 2020. The entire contents of each application noted above are hereby incorporated by reference.

BACKGROUND OF THE INVENTION

1. Field of the Invention

The present invention relates to display devices and input apparatuses.

2. Description of the Related Art

A known luminous display device in the related art includes a light guide that changes light incident from a first surface into diffused light and emits the light from a second surface opposite to the first surface and a plurality of point light sources disposed at intervals on a side of the second surface of the light guide, wherein the light guide has a light-shielding structure in which the light guide separates the first surface into a plurality of light emitting areas corresponding to one or more of the point light sources located immediately below and in which transmission of the light to adjacent light emitting areas is reduced (for example, see Japanese Patent Application Publication No. 2019-168571).

The light guide and the light-shielding structure of the known luminous display device are not soft and flexible. However, luminous display devices have recently been disposed in various locations, and a structure disposed in part of a flexible wall is under study. There is another need for manipulated input directly on a luminous display device.

SUMMARY OF THE INVENTION

The present invention provides a display device and an input apparatus having a flexible skin and shielding a plurality of optical paths from light.

A display device according to an embodiment of the present invention includes a flexible member having a light-transmissive property, a plurality of first light sources disposed on a side of a first surface of the flexible member, the first light sources outputting light toward the flexible member, a skin disposed on a side of a second surface of the flexible member opposite from the first surface, the skin including a plurality of first transmission areas that transmit the light output from the plurality of first light sources and passing through the flexible member as light representing shapes of a plurality of first symbols in plan view, and a first light-shielding wall at least part of which is disposed in the flexible member, the first light-shielding wall separating a plurality of first optical paths extending from the plurality of first light sources to the plurality of first transmission areas.

BRIEF DESCRIPTION OF THE DRAWINGS

FIGS. 13A and 13B are diagrams illustrating an example in which an input apparatus of a third modification of the embodiment is installed in a vehicle;

FIG. 13C is a planar configuration of the input apparatus;

DESCRIPTION OF THE PREFERRED EMBODIMENTS

Embodiments of a display device and an input apparatus of the present invention will be described hereinbelow. Hereinafter, like components are denoted by like reference signs, and descriptions thereof may be omitted. The thicknesses and lengths of the components may be shown in an exaggerated form to facilitate understanding the structure.

Figure 1:
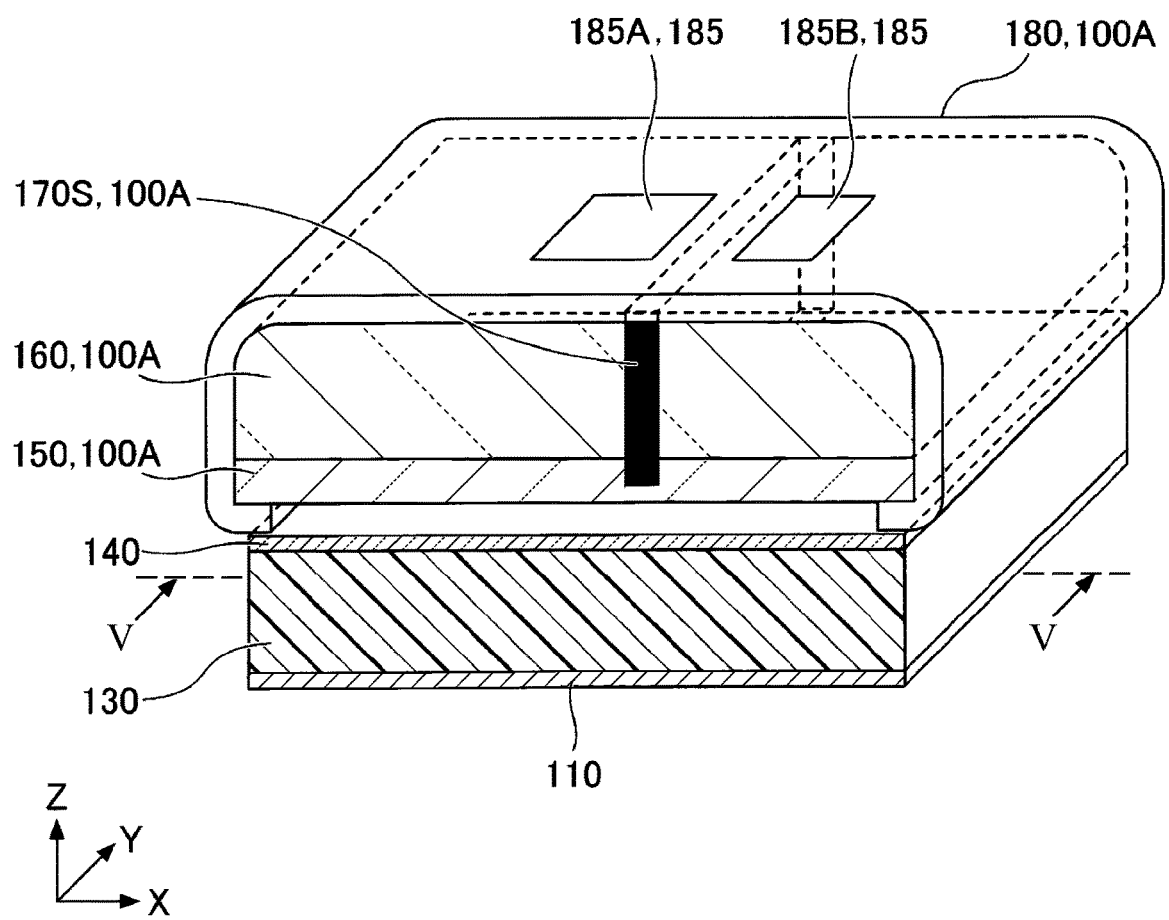
FIG. 1 is a diagram illustrating an input apparatus of an embodiment.
Figure 2:
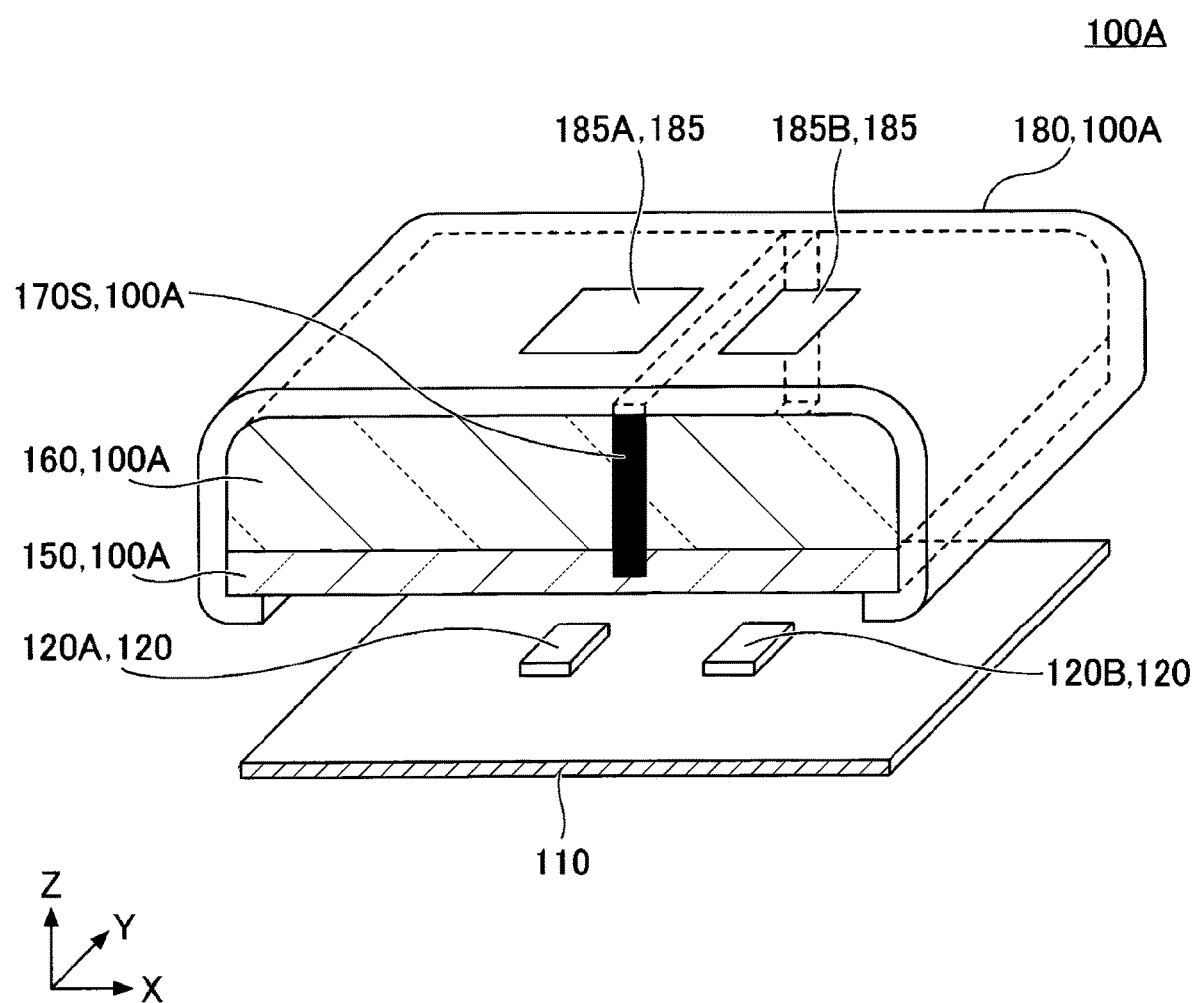
FIG. 2 is a diagram illustrating a display device of an embodiment.

FIG. 1 is a diagram illustrating an input apparatus 100 of an embodiment. FIG. 2 is a diagram illustrating a display device 100A of an embodiment. The following will be described in the X-Y-Z coordinate system. The −Z direction is below, and the +Z direction is above for the convenience of description. The plan view is an X-Y plan view.

The input apparatus 100 includes a substrate 110, a plurality of light emitting diodes (LEDs) 120, a case 130, an electrostatic sensor 140, a transparent plate 150, a cushion 160, a light-shielding wall 170S, and a skin 180. The input apparatus 100 may be longer in the X direction and the Y direction by way of example. FIG. 1 illustrates an example of the structure of a partial section in the X direction and the Y direction.

As shown in FIG. 2, the display device 100A of this embodiment has a structure in which at least the electrostatic sensor 140 is omitted from the input apparatus 100 and includes at least the substrate 110, the LED 120, the transparent plate 150, the cushion 160, the light-shielding wall 170S, and the skin 180. For this reason, the LED 120, the transparent plate 150, the cushion 160, the light-shielding wall 170S, and the skin 180 in FIG. 1 are additionally given reference sign 100A. The display device 100A shown in FIG. 2 has a structure in which the case 130 and the electrostatic sensor 140 are omitted from the input apparatus 100 shown in FIG. 1. Alternatively, the display device 100A may include the case 130.

Figure 3:
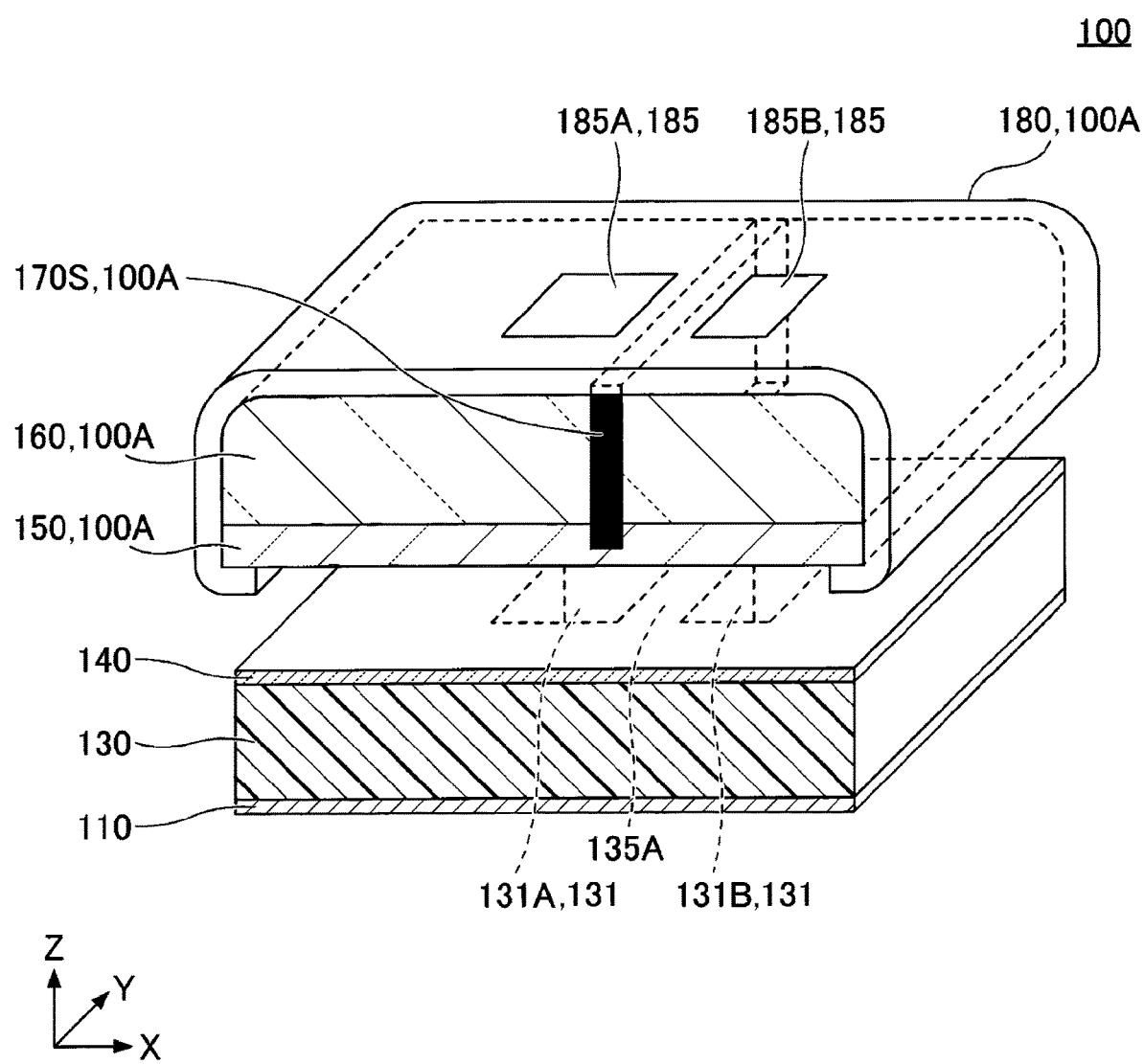
FIG. 3 is a diagram illustrating the input apparatus in partially exploded view.
Figure 4:
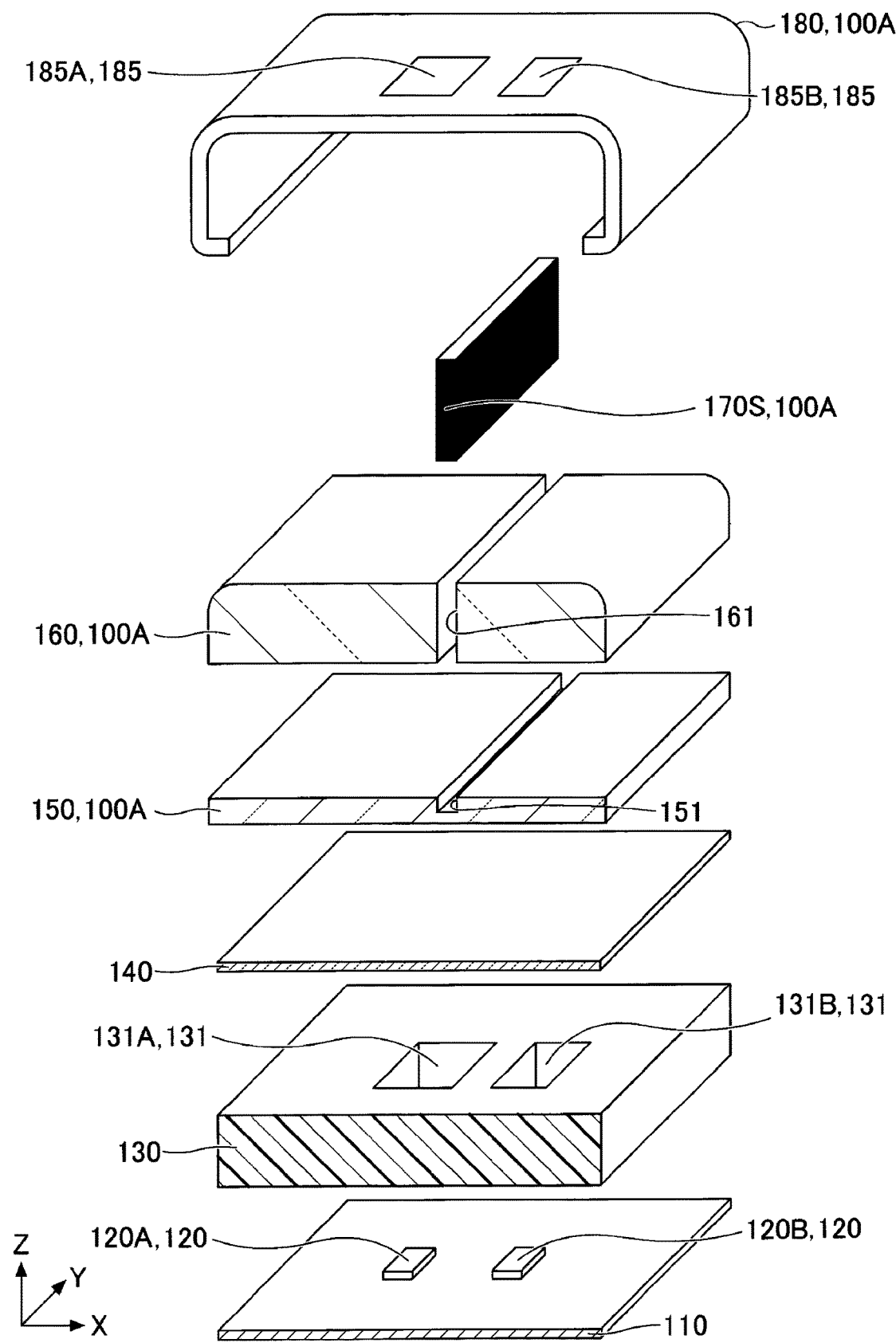
FIG. 4 is a diagram illustrating the input apparatus in exploded view.
Figure 5:
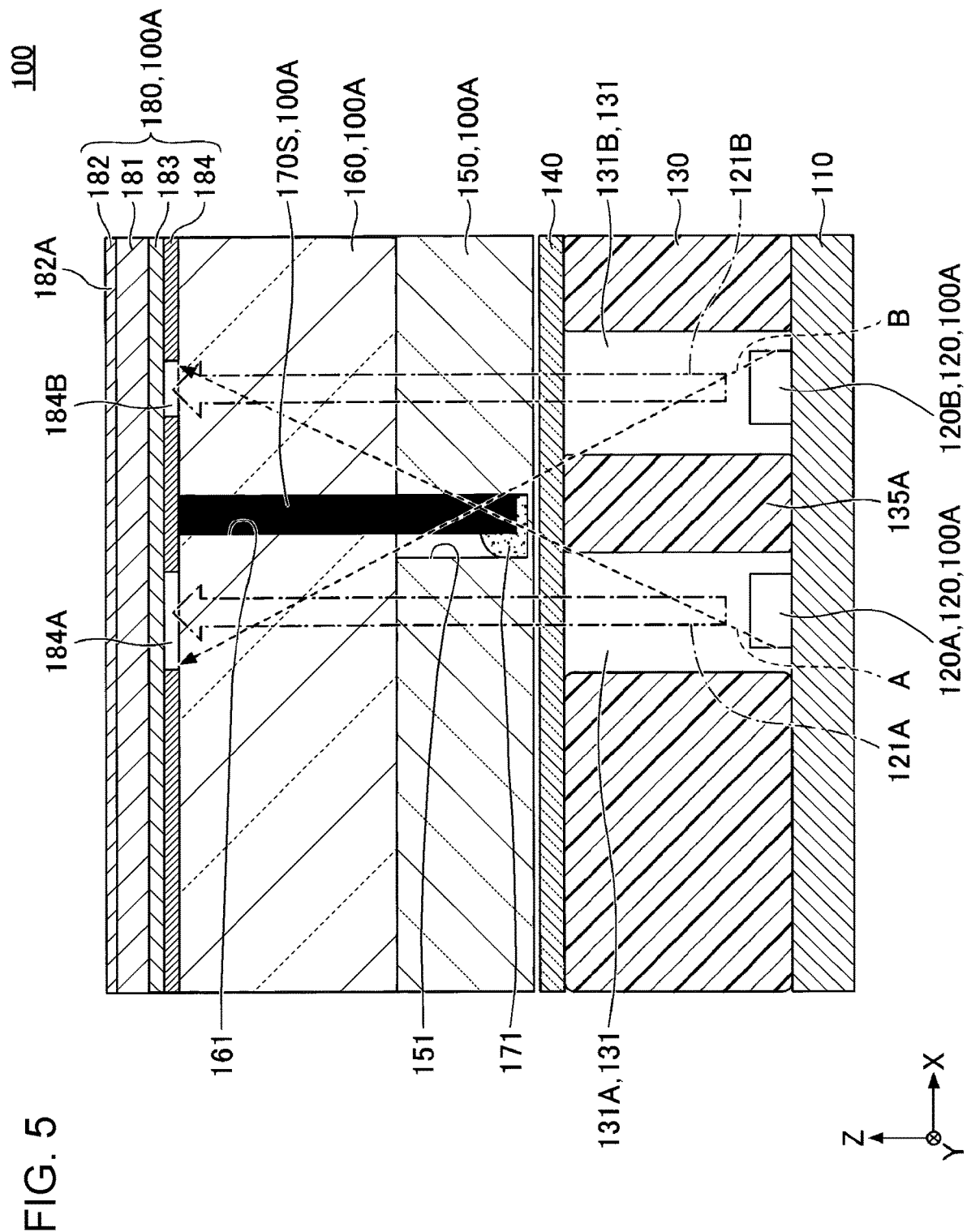
FIG. 5 is a cross-sectional view taken along arrow V-V in FIG. 1.
Figure 6:
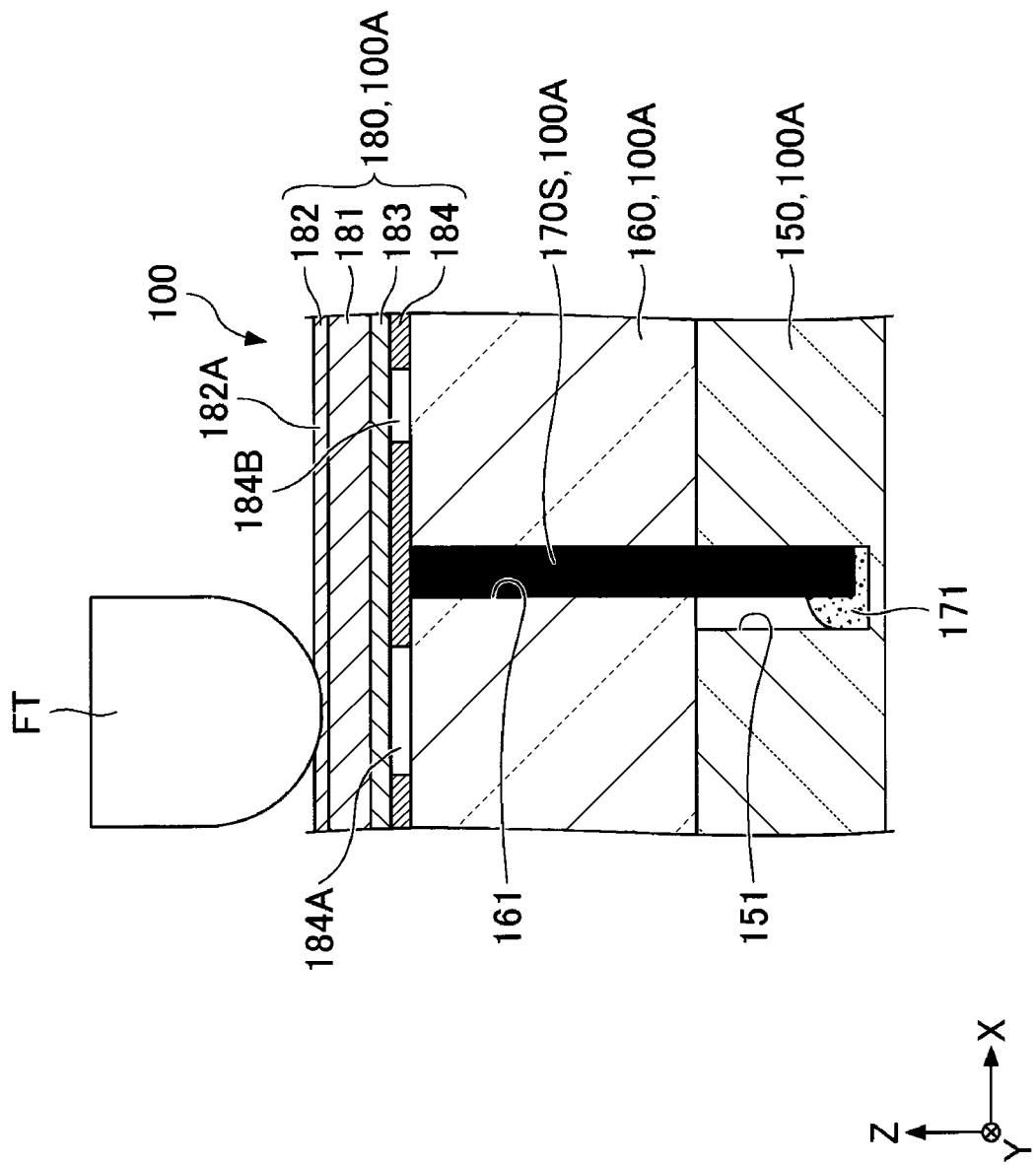
FIG. 6 is a diagram illustrating an example in which a user is operating the input apparatus.
Figure 7:
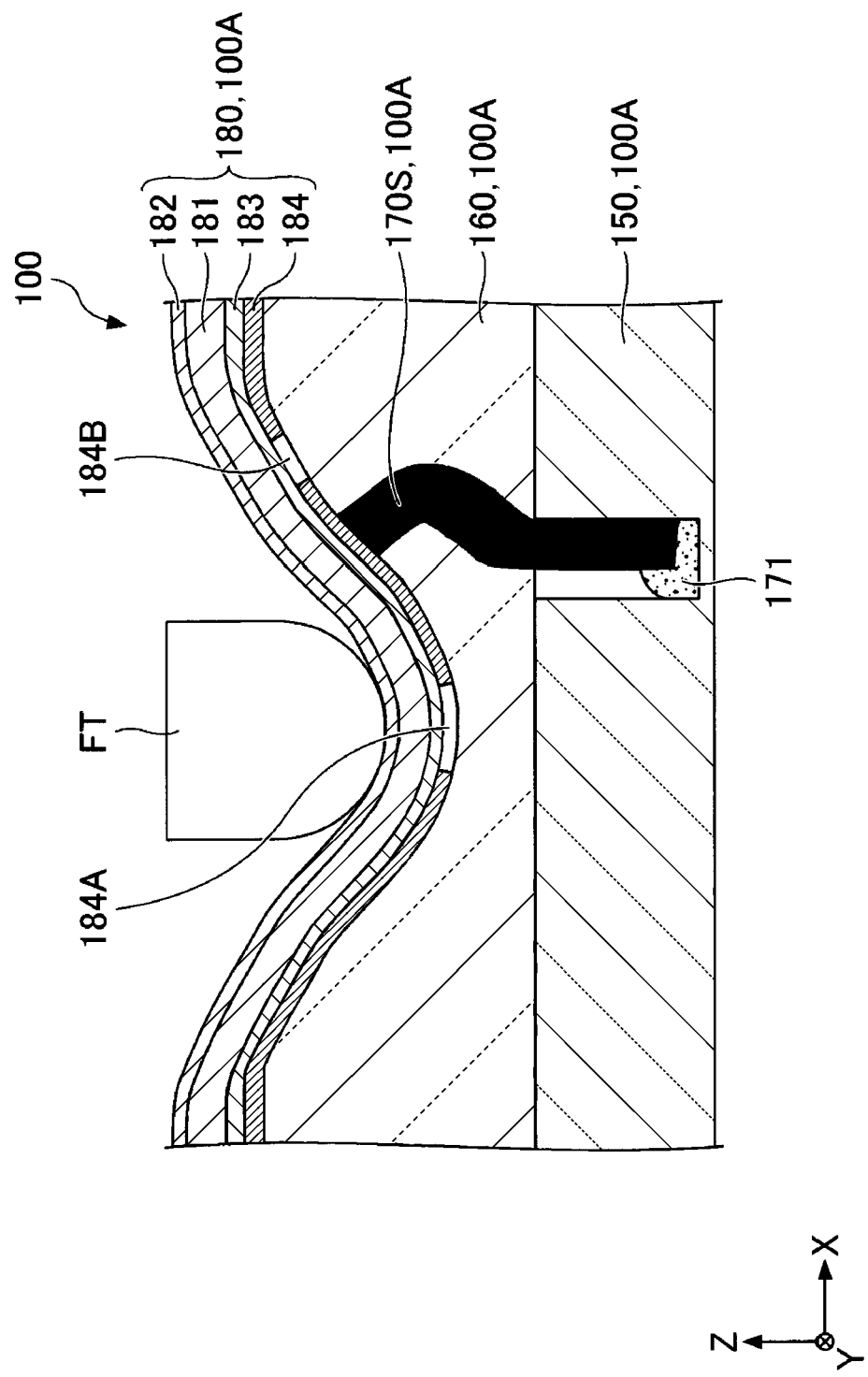
FIG. 7 is a diagram illustrating an example in which a user is operating the input apparatus.

The input apparatus 100 will be described hereinbelow with reference to FIGS. 3 to 7 in addition to FIGS. 1 and 2. FIG. 3 is a diagram illustrating the input apparatus 100 in partially exploded view. FIG. 4 is a diagram illustrating the substrate 110, the LED 120, the case 130, the electrostatic sensor 140, the transparent plate 150, the cushion 160, the light-shielding wall 170S, and the skin 180 in exploded view. FIG. 5 is a cross-sectional view taken along arrow V-V in FIG. 1. FIGS. 6 and 7 are diagrams illustrating examples in which a user is operating the input apparatus 100. FIGS. 6 and 7 illustrate part of the cross section in FIG. 5 in enlarged view.

In the input apparatus 100, the cushion 160, the light-shielding wall 170S, and the skin 180 have flexibility. The flexibility means a certain amount of softness and being deformable. One example is being soft enough, when the user pushes down the skin 180 as shown in FIG. 7 from a state in which a fingertip FT is in contact with the skin 180, as shown in FIG. 6, to deform the cushion 160, the light-shielding wall 170S, and the skin 180. The input apparatus 100 may include, in addition to the light-shielding wall 170S, a hard light-shielding wall. The hard light-shielding wall will be described later with reference to FIG. 10.

An example of the substrate 110 is an interconnection substrate. The substrate 110 has the plurality of LEDs 120 on the upper surface. The upper surface of the substrate 110 is in contact with the lower surface of the case 130. The substrate 110 and the case 130 are fixed together by bonding, screwing, or the like. An example of the substrate 110 is an interconnection substrate of the flame retardant type 4 (FR4) standard.

The plurality of LEDs 120 is mounted on the upper surface of the substrate 110. The plurality of LEDs 120 mounted on the upper surface of the substrate 110 is disposed on a side of the lower surface of the cushion 160. The lower surface of the cushion 160 is an example of a first surface of a flexible member. The plurality of LEDs 120 is connected to a control unit that controls the on (light on) and off (light off) of the individual LEDs 120 via the wiring lines (not shown) of the substrate 110. The control unit may be either outside or inside the input apparatus 100. The LEDs 120 are individually housed in a plurality of through-holes 131 of the case 130, with the LEDs 120 mounted on the upper surface of the substrate 110.

The plurality of LEDs 120 of the input apparatus 100 includes two LEDs 120A and 120B shown in FIG. 5. The LEDs 120A and 120B are disposed in through-holes 131A and 131B of the plurality of through-holes 131 of the case 130, respectively. The LEDs 120A and 120B of the plurality of LEDs 120 of the input apparatus 100 are examples of a plurality of first light sources. The term "LED 120" is used when not distinguished, unlike the LEDs 120A and 120B.

The input apparatus 100 has a configuration in which the plurality of optical paths of the light output from the plurality of LEDs 120 is separated. This configuration separates the optical paths 121A and 121B of the light output from the LEDs 120A and 120B to prevent intersection. The optical path 121A is an optical path connecting the LED 120A to an opening 184A of a mask 184, described later. The optical path 121B is an optical path connecting the LED 120B to an opening 184B of the mask 184, described later.

The case 130 is an example of a base and may be a casing. The case 130 is fixed on the substrate 110. As a result, the case 130 is disposed between the substrate 110 and the electrostatic sensor 140. In other words, the case 130 is disposed on the opposite side of the electrostatic sensor 140 from the transparent plate 150. An example of the case 130 is made of resin and does not transmit light. In other words, the case 130 has a light-shielding property. The case 130 has a plurality of through-holes 131 passing therethrough in the Z direction. FIG. 5 illustrates two through-holes 131A and 131B of the plurality of through-holes 131. The case 130 has a wall 135A between the through-holes 131A and 131B. The two through-holes 131A and 131B of the plurality of through-holes 131 of the input apparatus 100 are examples of a plurality of first through-holes. The wall 135A is an example of a first wall. The through-holes 131A and 131B house the LEDs 120A and 120B, respectively. The term "through-hole 131" in the following description is used when not distinguished, like the through-holes 131A and 131B. The substrate 110 is fixed to the lower surface of the case 130, and the plurality of LEDs 120 is individually housed in the plurality of through-holes 131.

The electrostatic sensor 140 is an example of a capacitive detection electrode. The electrostatic sensor 140 is disposed on the upper surface of the case 130. In other words, the electrostatic sensor 140 is disposed on the opposite side of the transparent plate 150 from the side on which the cushion 160 is held. The electrostatic sensor 140 may be any sensor including a transparent electrode made of, for example, indium tin oxide (ITO), to provide light transmittance. An example of the electrostatic sensor 140 is a self-capacitance touch panel including a transparent electrode made of ITO. The electrostatic sensor 140 has a size (lengths in the X direction and the Y direction) substantially the same as the sizes of the transparent plate 150 and the cushion 160.

For example, the electrostatic sensor 140 and the case 130 are fixed together by means of screwing or the like. The electrostatic sensor 140 detects the proximity of a living organism in the area above the electrostatic sensor 140. More specifically, the electrostatic sensor 140 detects an operation on the skin 180. The term "proximity" refers to the contact of a living organism with the skin 180 or approach to the skin 180 without contact. The electrostatic sensor 140 can detect the position where the living organism is in proximity to the skin 180. Here, an embodiment in which the living organism is a human fingertip FT (see FIGS. 6 and 7) will be described by way of example.

The transparent plate 150 is an example of a transparent plate-like member. The transparent plate 150 may be any plate made of a light-transmissive member, for example, a transparent resin. The transparent plate 150 is disposed above the electrostatic sensor 140. The transparent plate 150 and the electrostatic sensor 140 have constant spacing in the Z direction. The spacing will be described later. The sizes of the transparent plate 150 in the X direction and the Y direction are substantially the same as those of the substrate 110, the case 130, and the electrostatic sensor 140. The thickness of the transparent plate 150 in the Z direction is constant. The transparent plate 150 may be either colorless and transparent or colored and transparent. Here, a colorless transparent form will be described. The transparent plate 150 has a groove 151 formed from the upper surface. The groove 151 houses part of the light-shielding wall 170S on a side of the lower end, which is fixed using an adhesive 171. The lower end of the light-shielding wall 170S is an example of an end of a first light-shielding wall on a side of the first light source. The groove 151 that houses part of the light-shielding wall 170S on a side of the lower end is an example of a first groove. An example of the adhesive 171 is an adhesive having a light-shielding property. The lower end of the light-shielding wall 170S may be firmly fixed to the transparent plate 150 in the groove 151 using a means other than the adhesive. The adhesive 171 need not have a light-spieling property.

The position of the groove 151 in the X-Y plane is aligned with the position of the light-shielding wall 170S. This is because the lower end of the light-shielding wall 170S is fitted in the groove 151. The position of the groove 151 in the X-Y plane is aligned with the position of the wall 135A of the case 130. This is because the optical paths 121A and 121B are separated by the light-shielding wall 170S and the wall 135A.

The width of the groove 151 in the X direction is larger than the width (thickness) of the light-shielding wall 170S in the X direction. The length of the groove 151 in the Y direction is substantially equal to the length of the light-shielding wall 170S in the Y direction. Here, the light-shielding wall 170S extends in the Y direction in the X-Y plane. However, the light-shielding wall 170S can extend in various directions in the X-Y plane. For this reason, the width and length of the groove 151 in the X-Y plane may be determined according to the width and length of the light-shielding wall 170S in the X-Y plane.

The depth of the groove 151 is the length from the upper surface of the transparent plate 150 to the bottom of the groove 151 in the Z direction. The depth of the groove 151B is set so that the bottom of the groove 151 is below the lower end of the light-shielding wall 170S and the lower end of the light-shielding wall 170S can be bonded using an adhesive dropped onto the bottom of the groove 151.

The cushion 160 is fixed to the upper surface of the transparent plate 150. For example, the upper surface of the transparent plate 150 and the lower surface of the cushion 160 are bonded together. The transparent plate 150 holds the cushion 160 to serve as a reinforcing plate for reinforcing the cushion 160. In other words, the transparent plate 150 functions as a base that supports the cushion 160. The thickness of the transparent plate 150 in the Z direction is from about 1 mm to 3 mm, for example.

The cushion 160 is an example of a light-transmissive flexible member. In other words, the cushion 160 has light transmittance and flexibility. The cushion 160 has a light-transmissive property and functions as a light guide for guiding the light emitted from the LED 120 to the skin 180. The cushion 160 has flexibility and can be deformed when pushed downward, as shown in FIG. 7. The lower surface of the cushion 160 is an example of a first surface, and the upper surface is an example of a second surface.

An example of the cushion 160 is a non-woven fabric with a light-transmissive property. The thickness of the cushion 160 in the Z direction is constant. If a non-woven fabric is used as the cushion 160, it is preferable to use a non-woven fabric with vertically orientated (in the Z direction) fibers. The vertically oriented non-woven fabric exhibits large resilience when pushed in the vertical direction. Since the cushion 160 is pushed downward in the vertical direction, using a vertically oriented non-woven fabric as the cushion 160 provides the fingertip FT with resilience, thereby providing preferable tactile impression. The non-woven fabric of vertically oriented fibers is useful in guiding light in the vertical direction.

The cushion 160 has a slit 161, in which the light-shielding wall 170S is disposed. The slit 161 housing the light-shielding wall 170S is an example of a first slit. The slit 161 is formed parallel to the Y-Z plane, through which the cushion 160 passes in the Z direction. The width in the X direction and the length in the Y direction of the slit 161 are substantially the same as the thickness in the X direction and the length in the Y direction of the light-shielding wall 170S, respectively. The slit 161 is formed to the dimensions in the X direction and the Y direction of the light-shielding wall 170S so as not to form a gap between the slit 161 and the light-shielding wall 170S, with the light-shielding wall 170S housed. The thickness of the cushion 160 in the Z direction is from about 3 mm to 7 mm, for example. Since FIGS. 1 to 4 illustrate part of the whole of the input apparatus 100 and the display device 100A in the X direction and the Y direction, the cushion 160 is also partly shown in the X direction and the Y direction, and for the Y direction, only a portion in which the slit 161 is present is illustrated. For this reason, FIGS. 1 to 4 illustrate the slit 161 separating the cushion 160 into two pieces in the X direction. However, the entire cushion 160 is longer in the Y direction than the portion shown in FIGS. 1 to 4 and the length of the slit 161 in the Y direction. Accordingly, the portions of the cushion 160 on the opposite sides of the slit 161 in the X direction join together at at least one of the ends of the slit 161 in the +Y direction and the −Y direction.

The light-shielding wall 170S is an example of the first light-shielding wall, which is a fabric with a light-shielding property and flexibility. The fabric includes not only a woven fabric but also a non-woven fabric. For example, the light-shielding property of the light-shielding wall 170 is at a level that does not allow light from one side of the light-shielding wall 170S to pass to the other side, more specifically, at a level that does not allow transmission of light on one side to the other side to be visually viewed by the human eyes. An example of the light-shielding wall 170S is black. The adhesive 171 that bonds the lower end of the light-shielding wall 170S in the groove 151, if having an equivalent light-shielding property, provides a higher light-shielding effect to separate the optical paths 121A and 121B from each other more reliably.

The light-shielding wall 170S optically separates the optical paths 121A and 121B from each other together with the wall 135A of the case 130. For this purpose, the position of the light-shielding wall 170S in the X-Y plane is aligned with the position of the wall 135A separating the LEDs 120 in X-Y plan view. More specifically, since the light propagating through the optical paths 121A and 121B travels from below to above, the light-shielding wall 170S is located downstream from the wall 135A in the light propagation direction. To efficiently guide the light propagating upward in the through-holes 131A and 131B on the opposite sides of the wall 135A to the openings 184A and 184B of the mask 184, the light-shielding wall 170S and the adhesive 171 are not located in the through-holes 131A and 131B in plan view. For this purpose, the light-shielding wall 170S and the adhesive 171 are disposed in the area in which the wall 135A is located in plan view. Since the position of the adhesive 171 in plan view depends on the position of the groove 151 of the transparent plate 150, the groove 151 is disposed in the area in which the wall 135A is located in plan view.

To optically separate the optical paths 121A and 121B communicating with the openings 184A and 184B of the mask 184, the light-shielding wall 170S is disposed at a position aligned with the portion between the openings 184A and 184B of the mask 184 in plan view. Since the position of the adhesive 171 in plan view depends on the position of the groove 151 of the transparent plate 150, the groove 151 is disposed in the area between the openings 184A and 184B in plan view.

The light-shielding wall 170S extends in the Z direction from the bottom of the groove 151 of the transparent plate 150 to the upper end of the slit 161 of the cushion 160. The lower end of the light-shielding wall 170S may be in contact or out of contact with the bottom of the groove 151. The upper end of the light-shielding wall 170S is substantially flush with the upper surface of the cushion 160. At least part of the light-shielding wall 170S (here, a part in the slit 161) is disposed in the cushion 160 and extends in the cushion 160 from the upper end to the lower end of the cushion 160 in the Z direction. In other words, at least part of the light-shielding wall 170S is disposed in the slit 161.

The flexibility of the light-shielding wall 170S may be the same as or higher than the flexibility of the cushion 160. The fact that the flexibility of the light-shielding wall 170S is higher than the flexibility of the cushion 160 means that the light-shielding wall 170S is softer than the cushion 160. The reason why the light-shielding wall 170S has such flexibility is to prevent the user, when touching the skin 180 with the fingertip FT, as shown in FIG. 6, from noticing the presence of the light-shielding wall 170S. Another reason is to prevent the user, when pushing the skin 180 downward to deform the light-shielding wall 170S together with the cushion 160, as shown in FIG. 7, from feeling a noticeable difference, like a hard object, in the cushion 160.

The light-shielding wall 170S can be deformed together with the cushion 160, as shown in FIG. 7. The light-shielding wall 170S is deformed so as to be bent. Such deformation of the light-shielding wall 170S has been confirmed by experiments. The light-shielding wall 170S is not displaced because of the friction with the inner wall of the slit 161. For this reason, when the user separates the fingertip FT from the skin 180, the cushion 160, the light-shielding wall 170S, and the skin 180 recover the initial state as shown in FIG. 6.

The light-shielding wall 170S is merely fitted in the slit 161 of the cushion 160 an is not bonded. The light-shielding wall 170S is bonded with the adhesive 171 at the bottom of the groove 151 of the transparent plate 150 below the cushion 160. The hardness of the hardened adhesive 171 is higher than the hardness of the light-shielding wall 170S and the cushion 160. Accordingly, when the user touches the cushion 160, the adhesive 171, if present in the vicinity of the surface of the cushion 160, can give a noticeable difference, like a hard object, in the cushion 160. For this reason, for example, the light-shielding wall 170S is fixed with the adhesive 171 at the bottom of the groove 151 of the transparent plate 150 below the cushion 160, and the light-shielding wall 170S and the inner wall of the slit 161 of the cushion 160 are not bonded. The light-shielding wall 170S is held by the inner wall of the slit 161 so that no displacement is caused by the friction with the inner wall of the slit 161.

Here, a form in which the light-shielding wall 170S has a width (thickness) in the X direction, a length in the Y direction, and a length in the Z direction will be described. Among them, the width (thickness) of the light-shielding wall 170S in the X direction is the thickness of a fabric used as the light-shielding wall 170S. The length of the light-shielding wall 170S in the Y direction depends on, for example, the dimensions of the openings 184A and 184B of the mask 184 in the Y direction and the positional relationship with an opening (not shown) adjacent to the opening 184A in the Y direction. The mask 184 has other openings, in addition to the openings 184A and 184B. The plurality of openings of the mask 184 including the openings 184A and 184B is distributed in various positions in the X-Y plane. For this reason, the light-shielding wall 170S can have its length in various directions in the X-Y plane.

The length of the light-shielding wall 170S in the Z direction is determined as follows. The light-shielding wall 170S shown in FIG. 5 optically separates the respective optical paths 121A and 121B of the LEDs 120A and 120B in the X-Z plane. Locating the light-shielding wall 170S on arrow A connecting an end of the LED 120A in the −X direction, the upper end of the wall 135A, and an end of the opening 184B of the mask 184 in the +X direction and on arrow B connecting an end of the LED 120B in the +X direction, the upper end of the wall 135A, and an end of the opening 184A of the mask 184 in the +X direction allows the light-shielding wall 170S to optically separate the optical paths 121A and 121B from each other.

The arrows A and B correspond to optical paths passing through the lowest position in the electrostatic sensor 140, the transparent plate 150, or the cushion 160 among optical paths through which the light output from the LEDs 120A and 120B can enter the openings 184B and 184A, respectively, without being blocked by the wall 135A if the light-shielding wall 170S is not present. Accordingly, the length of the light-shielding wall 170S in the Z direction is set so that the light-shielding wall 170S can block such optical paths. The length of the light-shielding wall 170S in the Z direction may have an allowance in consideration of manufacturing errors or the like. The adhesive 171 that fixes the lower end of the light-shielding wall 170S to the bottom of the groove 151 has a light-shielding property equivalent to that of the light-shielding wall 170S. For this reason, locating both the light-shielding wall 170S and the adhesive 171 on the optical paths indicated by the arrows A and B allows the optical paths 121A and 121B to be optically separated more effectively. To reduce the reflection of light in the through-holes 131A and 131B, the case 130 preferably has a light-absorbing configuration. For example, the case 130 may be made of a black resin, or the inner surfaces of the through-holes 131A and 131B may be coated in black.

Figure 10:
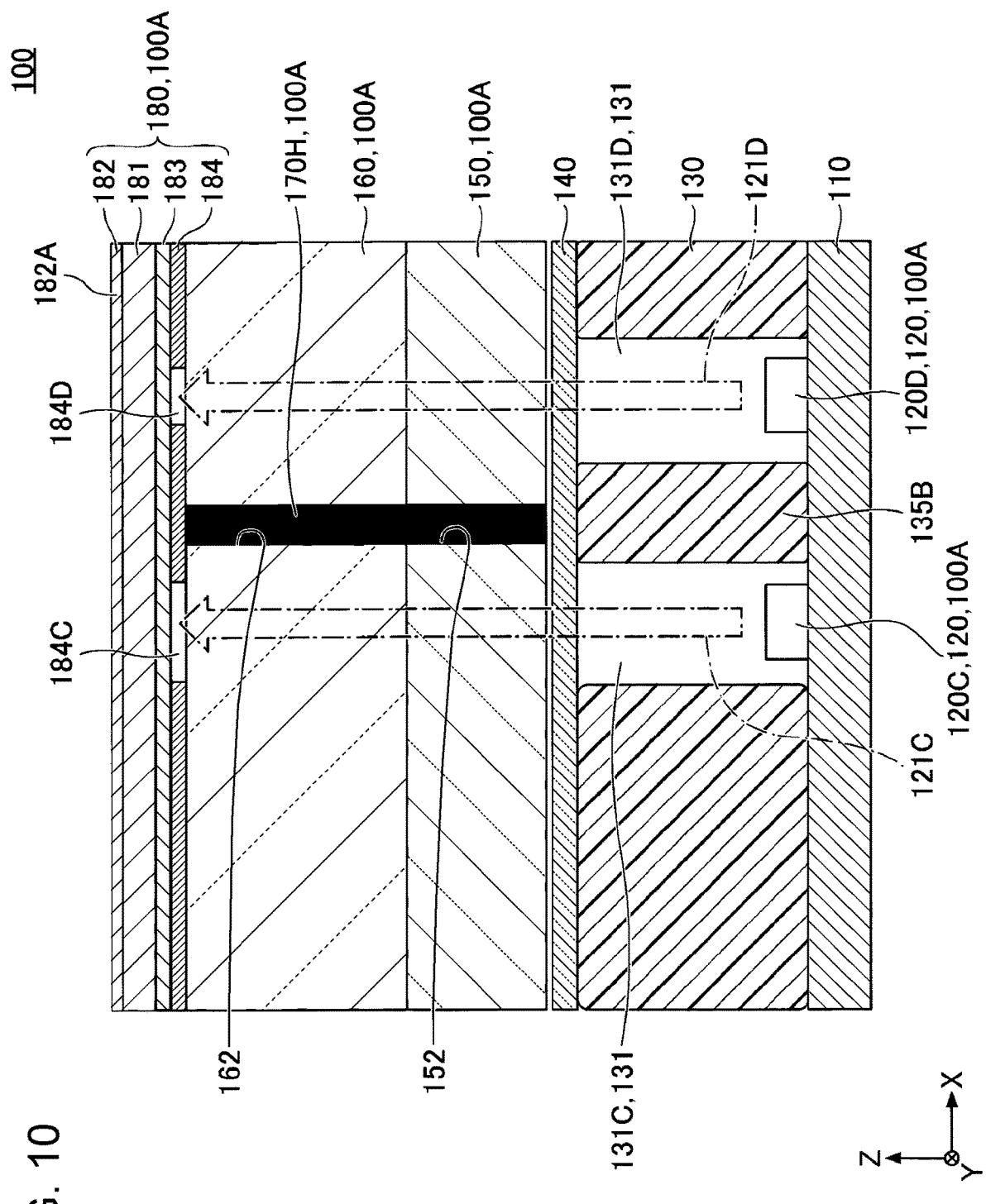
FIG. 10 is a diagram illustrating the cross-section structure of a portion of the input apparatus including a light-shielding wall.

Here, the light-shielding wall 170S serving as the first light-shielding wall is a fabric with a light-shielding property and flexibility. The light-shielding wall 170S has flexibility to prevent the user from detecting the light-shielding wall 170S even if the user touches the skin 180 with the fingertip FT. An alternative configuration is possible in which, when the user touches the skin 180 with the fingertip FT, the user can detect a light-shielding wall serving as the first light-shielding wall. In this case, a light-shielding wall with a hardness higher than the hardness of the flexible light-shielding wall 170S, like a light-shielding wall 170H described later with reference to FIG. 10, is used as the first light-shielding wall. A further alternative is a configuration in which the first light-shielding wall includes both a portion formed of the flexible light-shielding wall 170S and a portion formed of a hard light-shielding wall.

The skin 180 includes a base 181, an irregular portion 182, a decoratively printed portion 183, and the mask 184. FIGS. 1 to 4 illustrate the skin 180 in a simplified manner. FIGS. 5 to 7 illustrate the base 181, the irregular portion 182, the decoratively printed portion 183, and the mask 184. The skin 180 is a member located above the case 130 and on the outer surface of the input apparatus 100. As shown in FIGS. 1 to 3, the skin 180 covers the upper surface and the side surface of the cushion 160 in which the light-shielding wall 170S is disposed and the side surface of the transparent plate 150 and extends to the lower surface of the transparent plate 150. As shown in FIGS. 1 to 3, the skin 180 is bonded to the side surface and the end of the lower surface of the transparent plate 150 while covering the transparent plate 150, the cushion 160, and light-shielding wall 170S. Since the skin 180 is mounted to the transparent plate 150, the cushion 160, and the light-shielding wall 170S in this manner, the skin 180 and the cushion 160 are not bonded together.

A portion of the skin 180 above the cushion 160 is a portion where the user of the input apparatus 100 operates. The ends of the upper end of the cushion 160 in the +X direction and the −X direction are deflected into an arc shape in the X-Z cross sectional view by being covered by the skin 180. Thus, with the transparent plate 150, the cushion 160, and the light-shielding wall 170S covered by the skin 180, the transparent plate 150, the cushion 160, the light-shielding wall 170S, and the skin 180 are fixed above the electrostatic sensor 140. Since the end of the skin 180 is held between the electrostatic sensor 140 and the transparent plate 150, a gap in the z direction is formed between the electrostatic sensor 140 and the transparent plate 150. Such a gap need not be formed.

The base 181 is a transparent sheet-like member serving as the base of the skin 180 and has flexibility. The irregular portion 182 is disposed on the outer surface of the base 181. The irregular portion 182 may be part of the outer surface of the base 181 or a transparent sheet-like member bonded to the outer surface of the base 181. The irregular portion 182 has recesses 182A. Portions of the irregular portion 182 where the recesses 182A are not provided protrude relative to the recesses 182A, thereby forming irregularities on the outer surface of the irregular portion 182. This irregular portion 182 is provided to provide the skin 180 with an appearance and texture like leather, for example.

The decoratively printed portion 183 is a printed layer to decorate the transparent base 181 and the irregular portion 182 with color or a pattern. For example, the decoratively printed portion 183 is provided to provide color or a pattern like leather to the skin 180. The decoratively printed portion 183 has a light-transmissive property.

The mask 184 includes a plurality of openings. The openings 184A and 184B shown in FIG. 5 are two of the plurality of openings of the mask 184. The openings 184A and 184B are examples of a first transmission area.

The mask 184 provides the light passing through the plurality of openings including the openings 184A and 184B with various symbol shapes. The light output from the LEDs 120A and 120B and propagating through the optical paths 121A and 121B becomes symbol-shaped light by passing through the openings 184A and 184B and further passes through the base 181, the irregular portion 182, and the decoratively printed portion 183. This causes various symbols to appear on the surface of the skin 180, with the light representing the shapes of the symbols. In other words, the surface of the skin 180 is irradiated with light representing various symbols. FIGS. 1 to 3 illustrate symbols 185A and 185B as examples of the plurality of symbols radiated on the surface of the skin 180. The symbols 185A and 185B are hereinafter simply referred to as "symbol 185" if no particular distinction is made.

Examples of the symbol include characters, numbers, signs, diagrams, and marks having predetermined meanings. The symbols here represent, for example, the functions and kinds of a plurality of operating units of the input apparatus 100. The openings 184A and 184B are cut-out portions of the mask 184 into the shapes of the symbols 185A and 185B, respectively. Accordingly, the mask 184 is a photomask for forming a positive image. The mask 184 is not limited to the photomask for forming a positive image but may be a photomask for forming a negative image.

In the above input apparatus 100, when the LEDs 120A and 120B are turned on, the symbols 185A and 185B are lighted on the surface of the skin 180, as shown in FIG. 1. FIG. 6 illustrates a state in which the user who selects the symbol 185A touches a portion of the surface of the skin 180 where the symbol 185A is displayed. FIG. 7 illustrates a state in which the user pushes down the portion of the symbol 185A. At that time, the electrostatic sensor 140 detects the operation on the position where the symbol 185A is displayed in plan view, with a change in capacitance. Thus, the operation on the symbol 185A is received.

Figure 8:
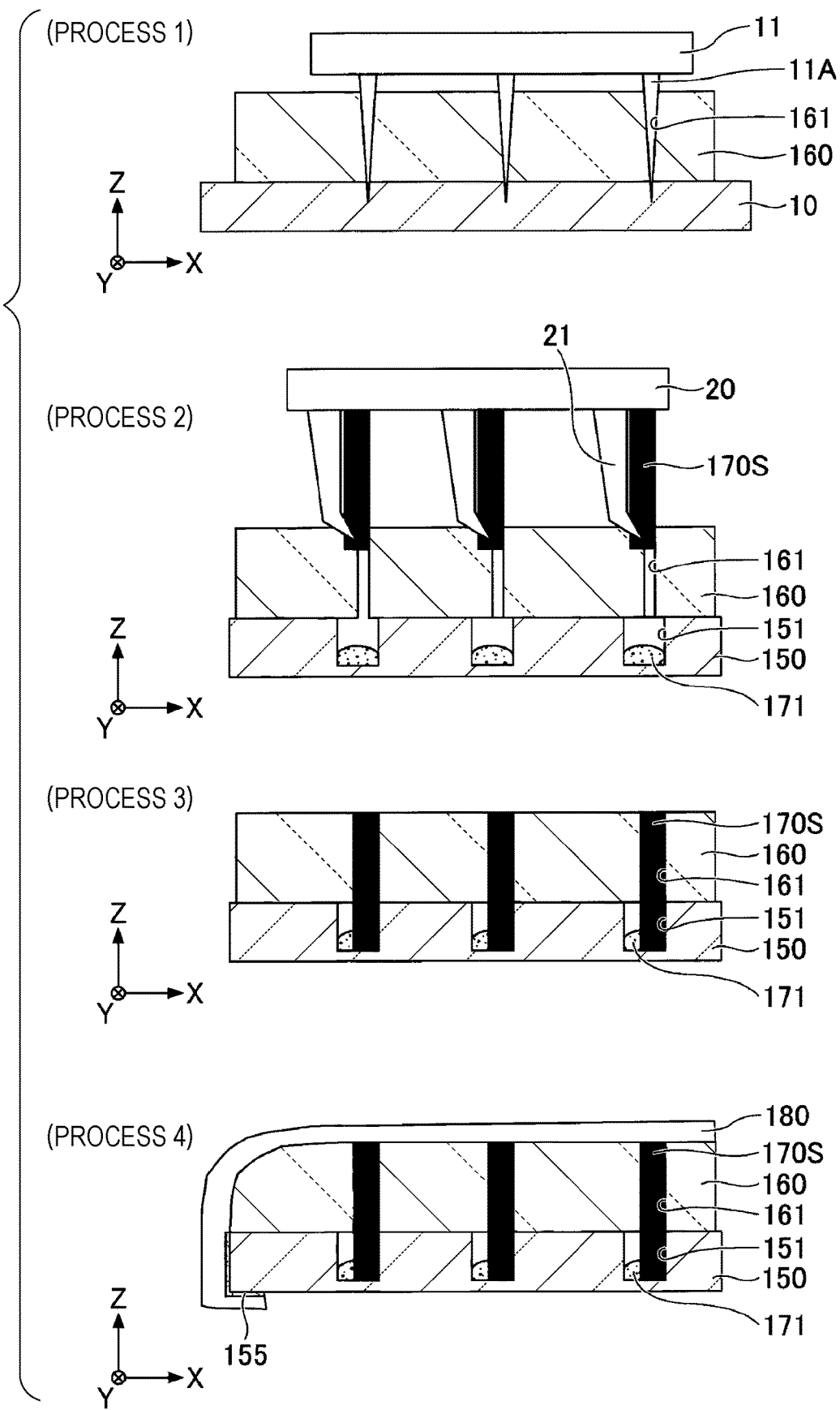
FIG. 8 is a diagram illustrating an example of the process of assembling a cushion, a light-shielding wall, and a skin.

FIG. 8 is a diagram illustrating an example of the process of assembling the cushion 160, the light-shielding wall 170S, and the skin 180. FIG. 8 illustrates processes 1 to 4 from above to below. In process 1, the cushion 160 is placed on a work table 10. Blades 11A of a trimming die 11 are stuck into the cushion 160 to form the slits 161. The blades 11A of the trimming die 11 are configured to provide the width of the slits 161. The length of the slits 161 in the Y direction may be adjusted by moving the trimming die 11 in the Y direction.

In process 2, the cushion 160 in which the slits 161 are formed is bonded on the transparent plate 150. At that time, the adhesive 171 is dropped onto the bottoms of the grooves 151 of the transparent plate 150. The light-shielding walls 170S are inserted into the slits 161 from above the slits 161, with the lower ends of the light-shielding walls 170S hooked on the lower ends of the bars 21 of a jig 20, and are pushed into the slits 161 until the lower ends of the light-shielding wall 170S reach the bottoms of the grooves 151.

After the lower ends of the light-shielding walls 170S are fixed to the bottoms of the grooves 151 with the adhesive 171, the jig 20 is drawn out. Thus, the light-shielding walls 170S are fitted in the slits 161 as in process 3.

Finally, in process 4, the skin 180 is placed over the transparent plate 150, the cushion 160, and the light-shielding walls 170S, and the end of the skin 180 is bonded to the side surface and the end of the lower surface of the transparent plate 150 with an adhesive 155. At that time, an end of the upper ends of the cushion 160 in the −X direction is bent in an arc shape in X-Z cross sectional view by being covered with the skin 180. Thus, the cushion 160, the light-shielding wall 170S, and the skin 180 are assembled with processes 1 to 4.

Each light-shielding wall 170S is fixed only at the lower end to the bottom of the groove 151 with the adhesive 171. Since the inner wall of the slit 161 and the light-shielding wall 170S are in close contact, misalignment of the cushion 160 and the light-shielding wall 170S does not occur even if the skin 180 is pushed downward to deform the cushion 160 and the light-shielding wall 170S, as shown in FIG. 7.

Alternatively, the inner wall of the slit 161 and the light-shielding wall 170S may be bonded, as follows. For example, in inserting each light-shielding wall 170S into each slit 161 with the jig 20 in process 2, a small amount of adhesive is applied to the surface of the light-shielding wall 170S (the surface parallel to the Y-Z plane) to apply the adhesive to the inner wall of the slit 161 while inserting the light-shielding wall 170S into the slit 161. At that time, the adhesive is applied not to the uppermost portion of the slit 161. This allows the adhesive to be applied to a portion of the surface of the light-shielding wall 170S other than the upper end, allowing the portion of the surface of the light-shielding wall 170S other than the upper end to be bonded to the inner wall of the slit 161. Since no adhesive adheres to the upper end of the surface of the light-shielding wall 170S, the surface of the cushion 160 has no portion fixed with the adhesive. Thus, even if the user touches the top of a portion of the cushion 160 where the light-shielding wall 170S is located, the user is not given a noticeable difference. Bonding the light-shielding wall 170S and the inner wall of the slit 161 together in this manner prevents the misalignment of the cushion 160 and the light-shielding wall 170S more effectively.

In place of applying an adhesive to the surface of the light-shielding wall 170S as described above, in inserting the light-shielding wall 170S into the slit 161 with the jig 20 in process 2, the jig 20 is pushed down until the light-shielding wall 170S reaches the bottom of the groove 151 to apply the adhesive 171 to the surface of the light-shielding wall 170S. At that time, the adhesive 171 is applied so as not to adhere to the surface of the upper end of the light-shielding wall 170S. Then, the jig 20 is moved upward to draw back the light-shielding wall 170S to the upper end of the slit 161. This allows the portion of the surface of the light-shielding wall 170S other than the upper end to be bonded to the inner wall of the slit 161.

Figure 9:
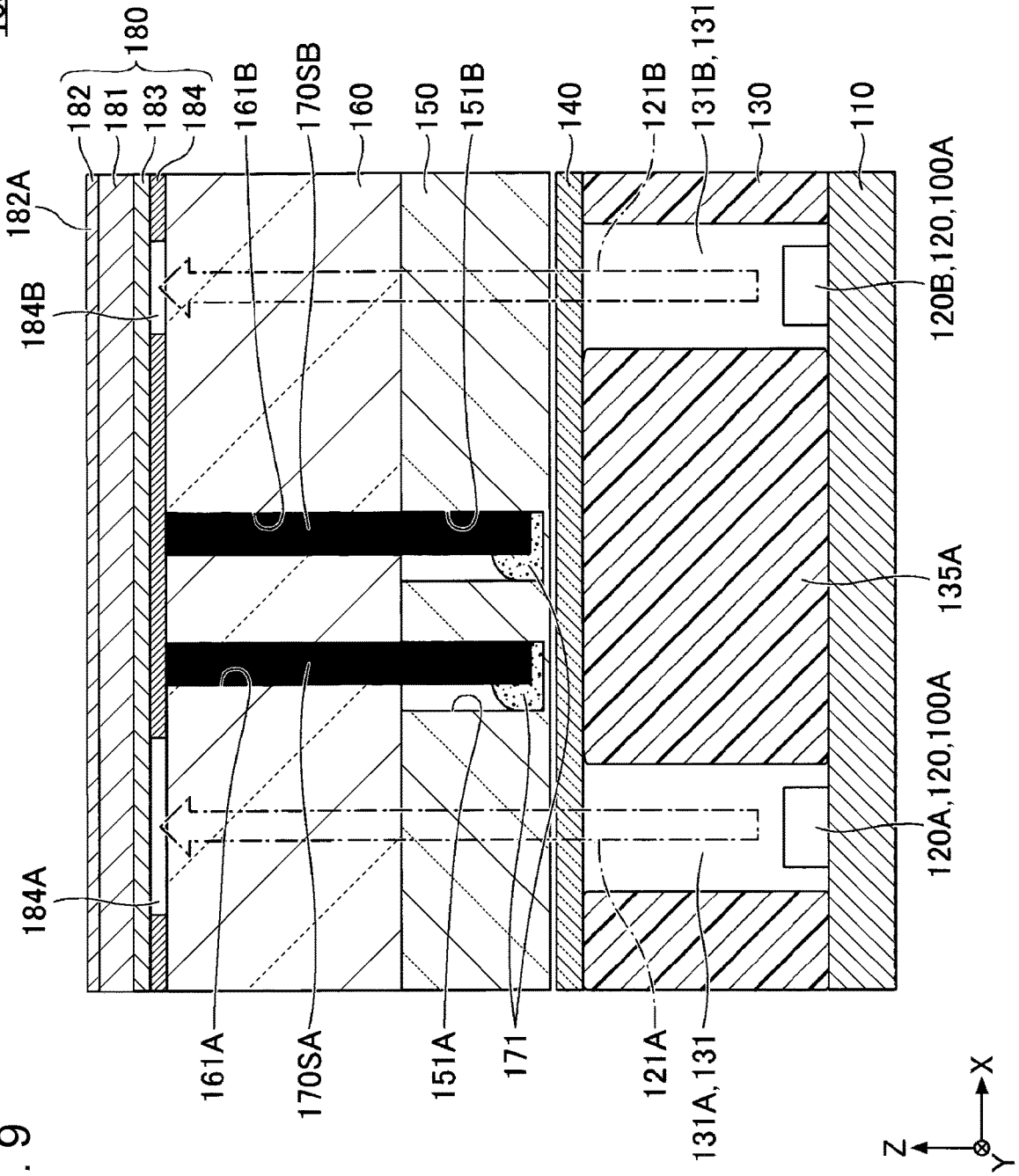
FIG. 9 is a diagram illustrating the cross-section structure of an input apparatus according to a first modification of the embodiment.

FIG. 9 is a diagram illustrating the cross-section structure of an input apparatus 100M1 according to a first modification of the embodiment. The input apparatus 100M1 has a configuration in which the light-shielding wall 170S of the input apparatus 100 shown in FIGS. 1 to 7 is replaced with light-shielding walls 170SA and 170SB. The light-shielding walls 170SA and 170SB constitute a double wall. The light-shielding wall 170SA is an example of the first light-shielding wall, and the light-shielding wall 170SB is an example of a third light-shielding wall.

The transparent plate 150 of the input apparatus 100M1 includes two grooves 151A and 151B between the optical paths 121A and 121B. The groove 151A is an example of the first groove, and the groove 151B is an example of a third groove. Both of the grooves 151A and 151B are disposed in the area in which the wall 135A is located and in an area between the openings 184A and 184B in plan view. This is for the purpose of providing the optical paths 121A and 121B.

The cushion 160 of the input apparatus 100M1 includes two slits 161A and 161B between the optical paths 121A and 121B. The positions of the slits 161A and 161B in plan view are aligned with the grooves 151A and 151B, respectively. The slit 161A is an example of the first slit, and the slit 161B is an example of a third slit.

The light-shielding walls 170SA and 170SB are fitted in the slits 161A and 161B, respectively. The lower ends of the light-shielding walls 170SA and 170SB are inserted into the grooves 151A and 151B, respectively, and are fixed with the adhesive 171. Accordingly, at least part of the light-shielding wall 170SA (a portion in the slit 161A) is disposed in the cushion 160. In other words, at least part of the light-shielding wall 170SA is disposed in the slit 161A. At least part of the light-shielding wall 170SB (a portion in the slit 161B) is disposed in the cushion 160. In other words, at least part of the light-shielding wall 170SB is disposed in the slit 161B. The light-shielding walls 170SA and 170SB are disposed in the area in which the wall 135A between the through-holes 131A and 131B of the case 130 in plan view is located.

For example, in the case where no sufficient light-shielding effect is given only with one light-shielding wall 170S, a double wall constituted by the light-shielding walls 170SA and 170SB is provided. The use of the light-shielding walls 170SA and 170SB constituting a double wall allows the optical paths 121A and 121B to be effectively optically separated from each other.

If the two light-shielding walls 170SA and 170SB are located so close that they touch, the user may feel a noticeable difference when touching the top of the two light-shielding walls 170SA and 170SB of the cushion 160 with the fingertip FT. For this reason, the two light-shielding walls 170SA and 170SB are preferably disposed at some intervals. This is for the purpose of decreasing the density of the light-shielding walls 170SA and 170SB and the cushion 160 as a whole to keep the softness of the cushion 160. Another purpose is to provide a sufficient strength to the cushion 160 at the portion between the two slits 161A and 161B. An example of the interval between the two light-shielding walls 170SA and 170SB is at least 3 mm or more. The interval between the light-shielding walls 170SA and 170SB is set, for example, according to the emission intensity of the LEDs 120A and 120B. To provide some interval between the two light-shielding walls 170SA and 170SB, the two light-shielding walls 170SA and 170SB are preferably disposed in the slits 161A and 161B, respectively. Depending on the interval between the light-shielding walls 170SA and 170SB, the grooves 151A and 151B do not have to be formed but one large groove that accepts both of the light-shielding walls 170SA and 170SB may be formed to house the light-shielding walls 170SA and 170SB.

This example illustrates the double wall. Alternatively, a light-shielding wall of a triple or more walls may be provided. In other words, the light-shielding wall may include two or more walls. In this case, the number of light-shielding walls is set according to, for example, the emission intensities of the LEDs 120A and 120B.

Referring next to FIG. 10, the light-shielding wall 170H, which is an example of a second light-shielding wall, will be described. FIG. 10 is a diagram illustrating the cross-section structure of a portion of the input apparatus 100 including the light-shielding wall 170H.

The input apparatus 100 includes the light-shielding wall 170H. FIG. 10 illustrates LEDs 120C and 120D of the plurality of LEDs 120, through-holes 131C and 131D of the plurality of through-holes 131 of the case 130, a wall 135B of the case 130, a through-hole 152 of the transparent plate 150, a slit 162 of the cushion 160, and openings 184C and 184D of the plurality of openings of the mask 184.

The LEDs 120C and 120D of the plurality of LEDs 120 of the input apparatus 100 are examples of a plurality of second light sources. The term "LED 120" is used when not distinguished, unlike the LEDs 120C and 120D and the LEDs 120A and 120B shown in FIG. 5.

The through-holes 131C and 131D of the plurality of through-holes 131 are examples of a plurality of second through-holes. The wall 135B of the case 130 is a wall located between the through-holes 131C and 131D and an example of a second wall. The through-hole 152 of the transparent plate 150 is an example of a through-hole provided in the transparent plate-like member. The slit 162 of the cushion 160 is an example of a second slit. The openings 184C and 184D of the plurality of openings of the mask 184 are examples of a plurality of second transmission areas.

Optical paths 121C and 121D of the light emitted from the LEDs 120C and 120D pass through the through-holes 131C and 131D, the transparent plate 150, and the cushion 160 to reach the openings 184C and 184D of the mask 184, respectively. The optical paths 121C and 121D are optically separated from each other by the wall 135B and the light-shielding wall 170H. The optical paths 121C and 121D are examples of a second optical path.

The light-shielding wall 170H has a light-shielding property and a certain degree of hardness to separate the optical paths 121C and 121D from each other. The light-shielding wall 170H may have a light-shielding property equivalent to that of the light-shielding wall 170S to optically separate the optical paths 121C and 121D from each other. An example of the light-shielding wall 170H is black. The light-shielding wall 170H may be made of any material having a certain degree of hardness. In this embodiment, the light-shielding wall 170H is made of resin.

The hardness of the light-shielding wall 170H is greater than the hardness of the light-shielding wall 170S shown in FIG. 5. In other words, the light-shielding wall 170H is harder than the light-shielding wall 170S. The light-shielding wall 170H may be hard enough not to be deformed even if the upper end is traced with the fingertip FT.

The light-shielding wall 170H is disposed in the through-hole 152 of the transparent plate 150 and the slit 162 of the cushion 160 to extend between the electrostatic sensor 140 and the skin 180. In other words, at least part of the light-shielding wall 170H (here, a portion in the slit 162) is disposed in the cushion 160. In other words, at least part of the light-shielding wall 170H is disposed in the slit 162.

Since the light propagating through the optical paths 121C and 121D travels from below to above, the light-shielding wall 170H is located downstream from the wall 135B in the light propagation direction. To efficiently guide the light propagating upward in the through-holes 131C and 131D on the opposite sides of the wall 135B to the openings 184C and 184D of the mask 184, the light-shielding wall 170H is not located in the through-holes 131C and 131D in plan view. For this purpose, the light-shielding wall 170H is disposed in the area in which the wall 135B is located in plan view. To optically separate the optical paths 121C and 121D communicating with the openings 184C and 184D of the mask 184, the light-shielding wall 170H is disposed at a position aligned with the portion between the openings 184D and 184D of the mask 184 in plan view.

The sizes (the widths in the X direction and the lengths in the Y direction) of the through-hole 152 and the slit 162 in plan view are matched to the size (the width in the X direction and the length in the Y direction) of the light-shielding wall 170H in plan view so that the light-shielding wall 170H is fitted without a gap. For example, the length of the light-shielding wall 170H in the Z direction is equal to the distance from the lower surface of the transparent plate 150 to the upper surface of the cushion 160. The length (height) of the light-shielding wall 170H in the Z direction is constant in the Y direction. The upper end of the light-shielding wall 170H is flush with the upper surface of the cushion 160 when inserted into the slit 162. In other words, the upper end of the light-shielding wall 170H is exposed to the upper surface of the cushion 160 when inserted into the slit 162. This is for the purpose of optically separating the optical paths 121C and 121D from each other in the interval between the upper surface of the electrostatic sensor 140 and the lower surface of the mask 184.

Such a light-shielding wall 170H is formed integrally with the transparent plate 150 with two-color molding, for example. In other words, for example, the through-hole 152 is formed before in forming the transparent plate 150, and the light-shielding wall 170H extending in the through-hole 152 and protruding from the upper surface of the transparent plate 150 is formed by means of two-color molding. To the contrary, after the light-shielding wall 170H is formed, the transparent plate 150 including the through-hole 152 to be formed around the light-shielding wall 170H may be formed by means of two-color molding so that the light-shielding wall 170H is integrally formed in the through-hole 152. The length of the portion of the light-shielding wall 170H protruding from the upper surface of the transparent plate 150 in the Z direction is matched to the thickness of the cushion 160 in the Z direction. The upper end of the light-shielding wall 170H is flush with the upper surface of the cushion 160 when inserted into the slit 162.

Such a light-shielding wall 170H, although not visible from the surface of the skin 180, is provided so that the user feels like touching a hard protrusion when tracing the surface of the skin 180 with a fingertip. For example, the light-shielding wall 170H extending in the Y direction, as shown in FIG. 10, can be used as a guide for guiding the user's fingertip along the Y direction. For example, the combined use of the light-shielding wall 170H and the light-shielding wall 170S shown in FIG. 5 allows the wall 170H to be used as a guide for notifying the user that the area of the light-shielding wall 170S is an area in which various symbols 185 are displayed and that the light-shielding wall 170H is an outer end of the area.

FIG. 10 illustrates a configuration in which the light-shielding wall 170H is integrally formed with the transparent plate 150 using two-color molding. However, the light-shielding wall 170H does not have to be integrated with the transparent plate 150. For example, the transparent plate 150 including the through-hole 152 and the light-shielding wall 170H may be produced separately, and the light-shielding wall 170H may be inserted into the through-hole 152 and may be fixed with an adhesive or the like. In this case, the adhesive may have a light-shielding property like the adhesive 171 shown in FIG. 5. Alternatively, the lower end of the light-shielding wall 170H may be inserted into a groove similar to the groove 151, instead of the through-hole 152 in FIG. 5, and may be bonded. The groove used instead of the through-hole 152 is an example of a second groove. The lower end of the light-shielding wall 170H is an example of an end of the second light-shielding wall (light-shielding wall 170H) on a side of the first light source (LED 120A). Since the LED 120A, not shown in FIG. 10, is flush with the LEDs 120C and 120D (the upper surface of the substrate 110), the lower end of the light-shielding wall 170H is an end of the light-shielding wall 170H on a side of the LED 120A.

The light-shielding wall 170H may be disposed so as to separate a plurality of first optical paths together with the light-shielding wall 170S shown in FIG. 5. This allows the user to feel a touch on a hard protrusion at a position of the light-shielding wall 170H around the first optical path.

Figure 11:
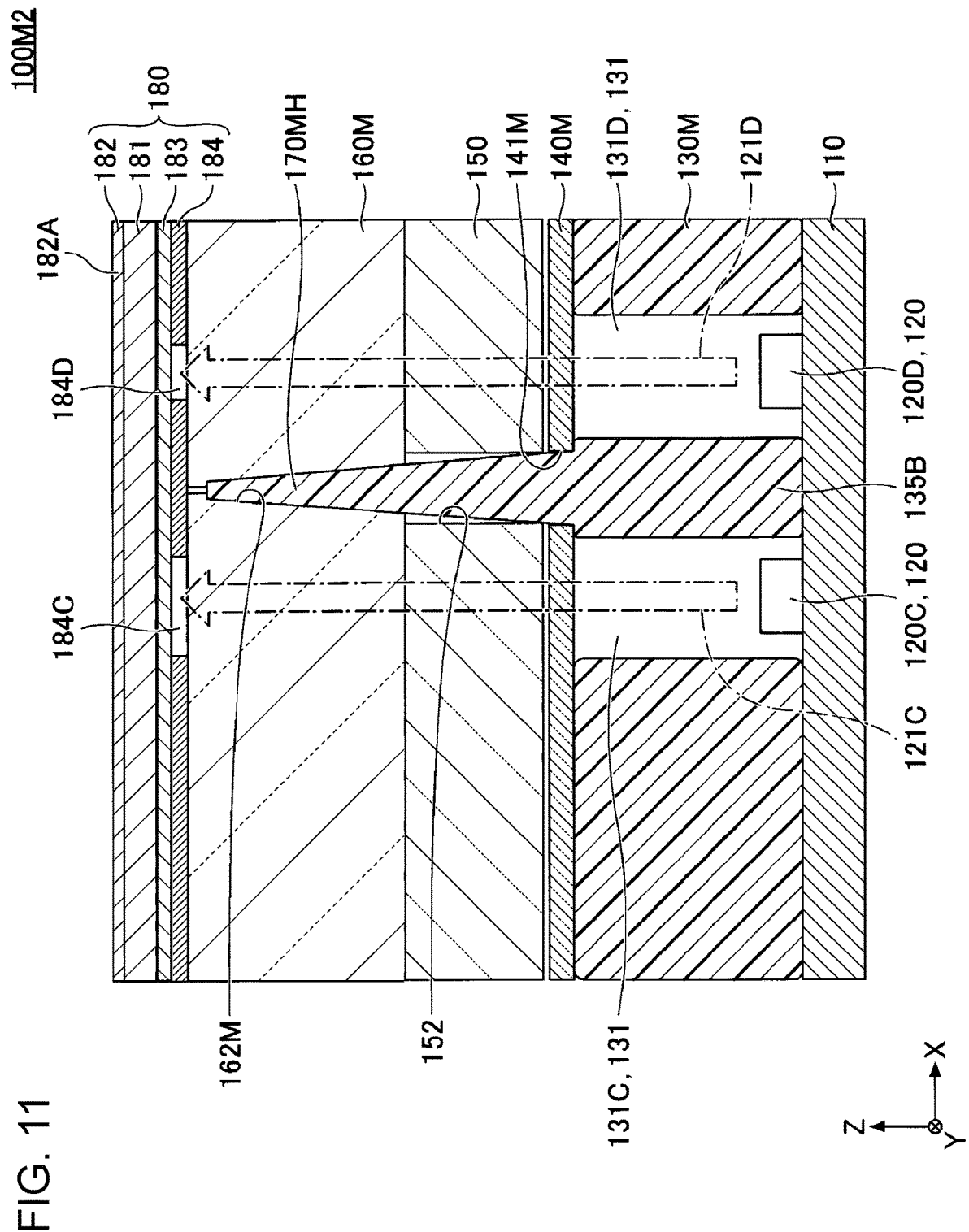
FIG. 11 is a diagram illustrating the cross-section structure of an input apparatus of a second modification of the embodiment.

FIG. 11 is a diagram illustrating the cross-section structure of an input apparatus 100M2 of a second modification of the embodiment. The input apparatus 100M2 has a configuration in which the light-shielding wall 170H of the input apparatus 100 shown in FIG. 10 is replaced with a light-shielding wall 170MH. The light-shielding wall 170MH is an example of the second light-shielding wall. Difference from the input apparatus 100 shown in FIG. 10 will be described hereinbelow.

The input apparatus 100M2 includes the light-shielding wall 170MH, so that the case 130, the electrostatic sensor 140, and the cushion 160 shown in FIG. 10 are replaced with a case 130M, an electrostatic sensor 140M, and a cushion 160M, respectively.

The light-shielding wall 170MH is an upward extension of the upper end of the wall 135B between the through-holes 131C and 131D of the case 130M. Accordingly, the light-shielding wall 170MH is part of the case 130M integrated therewith. The case 130M including the light-shielding wall 170MH has a light-shielding property similarly to the case 130 shown in FIG. 5.

The electrostatic sensor 140M includes a through-hole 141M at a position corresponding to the light-shielding wall 170MH. The electrostatic sensor 140M including the through-hole 141M differs in configuration from the electrostatic sensor 140 (see FIG. 5) implemented by a touch panel, for example, and is implemented by a transparent electrode provided for each of one or a plurality of symbols. The input apparatus 100M2 detects proximity of the fingertip to the skin 180 using the electrostatic sensor 140M. The electrostatic sensor 140M has a configuration in which an indium tin oxide (ITO) film formed on the surface of a glass plate or a transparent resin sheet is divided in correspondence with the positions where one or a plurality of symbols is displayed.

The cushion 160M includes a slit 162M. The cushion 160M is an example of a flexible member, and the slit 162M is an example of a second slit. In the input apparatus 100M2, the upper end of the light-shielding wall 170MH is off downward from the upper surface of the cushion 160M. In other words, the upper end of the light-shielding wall 170MH is off downward from the upper surface of the cushion 160M toward the lower surface. This provides an interval between the upper end of the light-shielding wall 170MH and the skin 180. The upper end of the light-shielding wall 170MH is an example of an end of the light-shielding wall 170MH on a side of a second surface.

When the light-shielding wall 170MH is inserted into the slit 162M from below, a portion of the slit 162M above the upper end of the light-shielding wall 170MH has not the light-shielding wall 170MH. When the user touches the skin 180 with the fingertip FT, the difference in touch between the slit 162M and a portion other than the slit 162M is preferably unnoticeable. For this purpose, a portion of the slit 162M above the upper end of the light-shielding wall 170MH is in a state equivalent to a state in which the slit 162M is closed, for example.

The achieve such a state, for example, the width of the slit 162M in the X direction is made smaller than that of the slit 161 shown in FIG. 5. The light-shielding wall 170MH may have a wedge cross-sectional shape in the X-Z plane, in which the width decreases from the lower end to the upper end, as shown in FIG. 11. Since the light-shielding wall 170MH extends in the Y direction by way example, the light-shielding wall 170MH extends in the Y direction. The cross section of the light-shielding wall 170MH parallel to the X-Z plane is perpendicular to the Y direction, or the extending direction.

In other words, the light-shielding wall 170MH has a wedge-shaped cross section in which the width in the X direction decreases from the lower end to the upper end in a cross-section (X-Z cross section) perpendicular to the extending direction (Y direction). The wedge shape is a shape in which the width (thickness) decreases gradually from one end to the other end. The one end is on a side of the lower surface (the first surface) of the cushion 160M, and the other end is on a side of the upper surface (the second surface) of the cushion 160M. In the case of the light-shielding wall 170MH, the fingertip FT touches the upper end with the skin 180 therebetween. For this reason, the wedge shape of the light-shielding wall 170MH1 in the X-Z cross section has a shape in which the vertex of the isosceles triangle is cut off parallel to the base. The light-shielding wall 170MH has such a wedge-shaped cross section.

The light-shielding wall 170MH with such a wedge-shaped cross section has the advantage of facilitating insertion into the slit 162M narrower in width than the slit 161 (see FIG. 5) and facilitating making a portion of the slit 162M above the upper end of the light-shielding wall 170MH closed.

In assembling the input apparatus 100M2, the light-shielding wall 170MH is inserted into the through-hole 141M when the electrostatic sensor 140M is fixed on the case 130M. In mounting the laminate of the transparent plate 150, the cushion 160M, and the skin 180 on the electrostatic sensor 140M, the light-shielding wall 170MH is inserted into the through-hole 152 of the transparent plate 150 and the slit 162M of the cushion 160M. At least part (here, a portion in the slit 162M) of the light-shielding wall 170MH is disposed in the cushion 160M. In other words, at least part of the light-shielding wall 170MH is disposed in the slit 162M.

Figure 12:
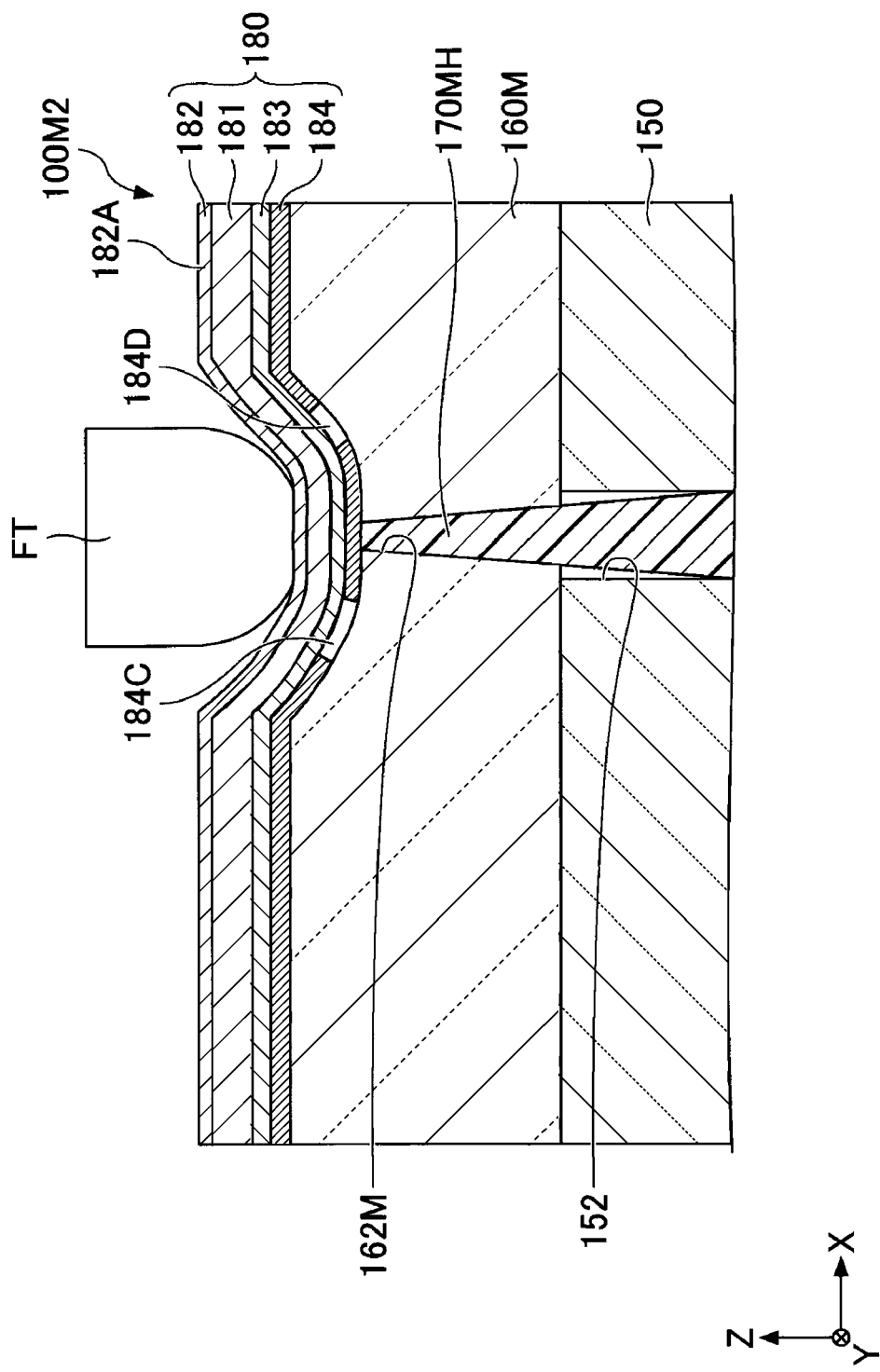
FIG. 12 is a diagram illustrating an example of a state in which the input apparatus is operated.

FIG. 12 is a diagram illustrating an example of a state in which the input apparatus 100M2 is operated. As shown in FIG. 12, when a portion of the surface of the skin 180 above the light-shielding wall 170MH is slightly pushed downward with the fingertip FT, the fingertip FT comes into contact with the upper end of the light-shielding wall 170MH, with the skin 180 therebetween. This gives the user a feeling of touching a hard protrusion with the fingertip FT. This allows the user to perceive a protrusion under the skin 180.

Figure 14:
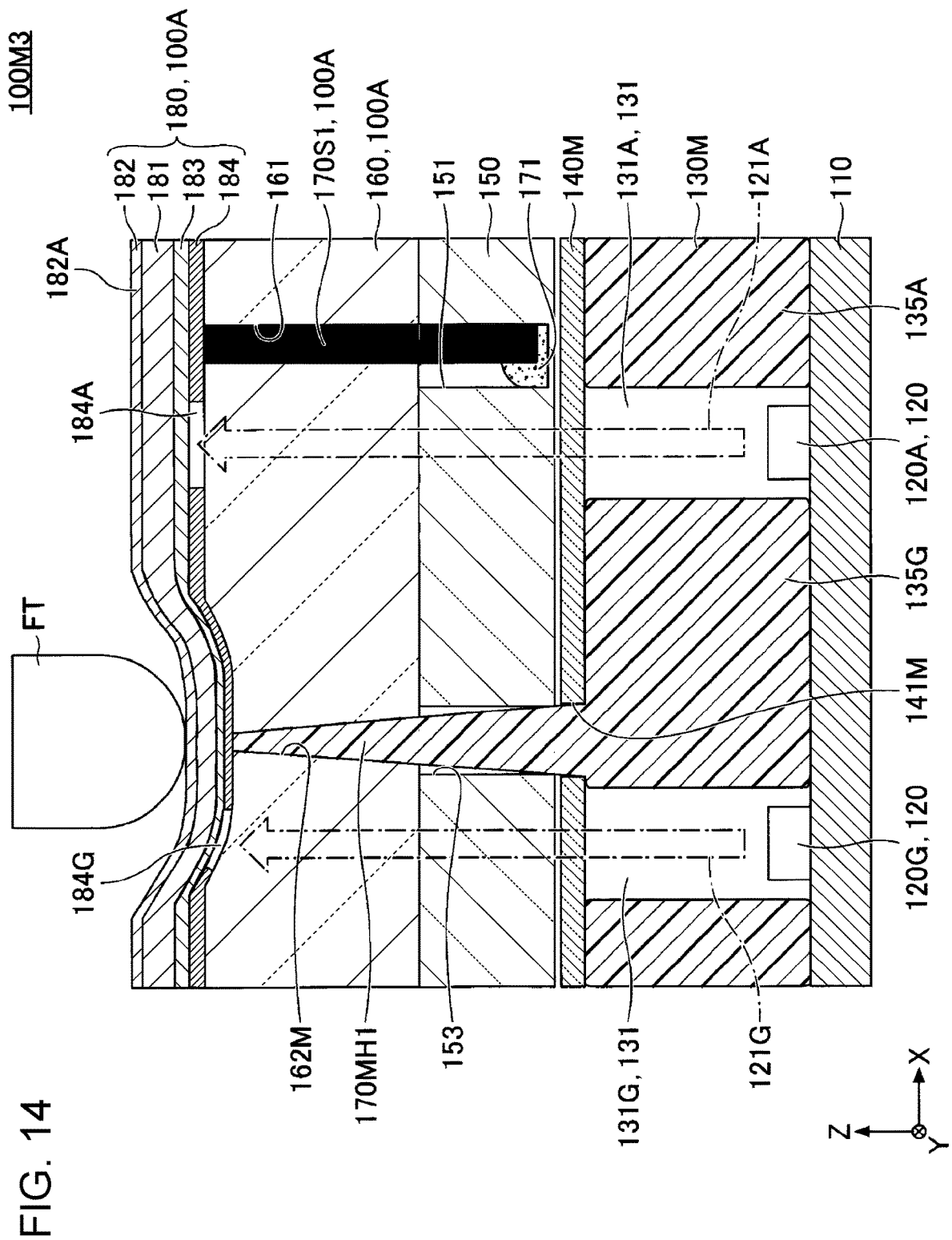
FIG. 14 is a diagram illustrating a state in which a fingertip pushes the skin downward in a cross section taken along line XIV-XIV in FIG. 13C.

FIGS. 13A and 13B are diagrams illustrating an example in which an input apparatus 100M3 of a third modification of the embodiment is installed in a vehicle 50. FIG. 13C is the planar configuration of the input apparatus 100M3. FIG. 14 is a diagram illustrating a state in which the fingertip FT pushes the skin 180 downward in a cross section taken along line XIV-XIV in FIG. 13C. The input apparatus 100M3 has a configuration in which the input apparatus 100 shown in FIGS. 1 to 7 and the input apparatus 100M2 shown in FIGS. 11 and 12 are combined. Accordingly, the input apparatus 100M3 will be described as being covered with the skin 180.

As shown in FIG. 13A, the input apparatus 100M3 is mounted on a center armrest 51A of a rear seat 51 of the vehicle 50 by way of example. The skin 180 is exposed to the upper surface of the center armrest 51A. A portion of the input apparatus 100M3 without the skin 180 has a configuration shown in FIG. 13B. FIG. 13C illustrates a portion corresponding to the portion enclosed by the broken line in FIG. 13B. Here, the input apparatus 100M3 is mounted on the center armrest 51A of the rear seat 51. Alternatively, the input apparatus 100M3 may be mounted on a center armrest of a front seat. The input apparatus 100M3 may be mounted not only on the center armrest but also on the wall linings of doors or other portions. The input apparatus 100M3 may be mounted not only in the vehicle 50 but also in trains or aircrafts.

FIG. 13C illustrates the positional relationship among light-shielding walls 170S1 to 170S7, light-shielding walls 170MH1 to 170MH4, and symbols 185A and 185B and 185E to 185N. The light-shielding wall 170S1 to 170S7 are examples of the first light-shielding wall. The light-shielding wall 170S1 located between the symbols 185A and 185B corresponds to the light-shielding wall 170S shown in FIG. 5. The light-shielding walls 170S2 to 170S7 are formed of a deformable soft fabric, by way of example, as is the light-shielding wall 170S described with reference to FIGS. 1 to 7. The light-shielding walls 170MH1 to 170MH4 are examples of the second light-shielding wall. Here, the cross-section structure shown in FIG. 14 will be described before the planar configuration shown in FIG. 13C and the details of a method for operating the input apparatus 100M3 are described.

FIG. 14 illustrates a state in which the surface of the skin 180 is pushed downward with the fingertip FT, in which the lower surface of the skin 180 comes into contact with the upper end of the light-shielding wall 170MH1 by slightly pushing the surface of the skin 180 downward. In other words, the upper end of the light-shielding wall 170MH1 is off downward from the upper surface of the cushion 160. This is the same as the light-shielding wall 170MH, described with reference to FIGS. 11 and 12, as well as the light-shielding walls 170MH2 to 170MH4. The light-shielding walls 170MH1 to 170MH4 are made of resin and are so hard to be deformed and is off downward from the upper surface of the cushion 160.

As shown in FIG. 14, the case 130M includes through-holes 131A and 131G. The through-hole 131A is an example of the first through-hole, and the through-hole 131G is an example of the second through-hole. The through-holes 131A and 131G house LEDs 120A and 120G to be mounted on the upper surface of the substrate 110. The LED 120A is an example of the first light sources, and the LED 120G is an example of the second light sources. The LEDs 120A and 120G and openings 184A and 184G of the mask 184 are connected by optical paths 121A and 121G, respectively. The optical path 121A is an example of the first optical path, and the optical path 121G is an example of the second optical path.

As shown in FIG. 14, the through-hole 131A passes through the case 130M in the extending direction (Z direction) of the optical path 121A. Although FIG. 14 illustrates only the through-hole 131A as the first through-hole passing through the case 130M in the Z direction, through-holes provided in the case 130M in correspondence with the symbols 185B, 185E, and 185F shown in FIG. 13C pass through the case 130M in the extending direction (Z direction) of the optical paths corresponding to the symbols 185B, 185E, and 185F. Thus, the case 130M includes a plurality of first through-holes passing therethrough in the extending direction of the plurality of first optical paths. As shown in FIG. 14, the through-hole 131G passes through the case 130M in the extending direction (Z direction) of the optical path 121G.

The electrostatic sensor 140M is disposed on the opposite side of the transparent plate 150 from the cushion 160 and includes a through-hole 141M. The through-hole 141M is an example of the through-hole of the capacitive detection electrode. The through-hole 141M allows the light-shielding wall 170MH1 to pass therethrough. The light-shielding wall 170MH1 is a portion of the wall 135G around the through-hole 131G of the case 130M extending toward the skin 180. The wall 135G is a wall located around the through-hole 131G and between the through-hole 131A and the through-hole 131G. The wall 135G is an example of the second wall located around the second through-hole (the through-hole 131G).

As shown in FIG. 14, the transparent plate 150 includes the groove 151 and a through-hole 153, and the cushion 160 includes slits 161 and 162M. The groove 151 is an example of the first groove, and the through-hole 153 is an example of a through-hole disposed in the transparent plate-like member (the transparent plate 150). The slit 161 is an example of the first slit, and the slit 162M is an example of the second slit. The groove 151 and the slit 161 house the light-shielding wall 170S1. In other words, at least part of the light-shielding wall 170S1 is disposed in the slit 161. The through-hole 153 and the slit 162M house a light-shielding wall 170MH1. In other words, at least part of the light-shielding wall 170MH1 is disposed in the slit 162M. The light-shielding wall 170MH1 is housed in the through-hole 153 and the slit 162M while being inserted in the through-hole 141M of the electrostatic sensor 140M. FIG. 14 illustrates the light-shielding wall 170MH1 but does not illustrate the light-shielding walls 170MH2 to 170MH4. The light-shielding walls 170MH2 to 170MH4 have a similar configuration.

As shown in FIG. 14, the light-shielding wall 170MH1 optically separates the optical paths 121A and 121G from each other together with the wall 135G of the case 130M. For this purpose, the position of the light-shielding wall 170MH1 in the X-Y plane is aligned with the position of the wall 135G. More specifically, since the light propagating in the optical paths 121A and 121G travels from below to above, the light-shielding wall 170MH1 is located downstream from the wall 135G in the light propagating direction. To efficiently guide the light propagating upward in the through-holes 131A and 131G on the opposite sides of the wall 135G to the openings 184A and 184G of the mask 184, respectively, the light-shielding wall 170MH1 is not located in the through-holes 131A and 131G in plan view. The same configuration applies to the light-shielding walls 170MH2 to 170MH4.

The light-shielding wall 170MH1 has a wedge-shaped cross section in which the width in the X direction decreases from the lower end to the upper end in the cross section (X-Z cross section) perpendicular to the extending direction (Y direction), like the light-shielding wall 170MH shown in FIGS. 11 and 12. The upper end of the light-shielding wall 170MH1 receives the fingertip FT through the skin 180. For this reason, the wedge shape of the light-shielding wall 170MH1 in the X-Z cross section has a shape in which the vertex of the isosceles triangle is cut parallel to the base. The same applies to the light-shielding walls 170MH2 to 170MH4.

Next, the planar configuration shown in FIG. 13C and the details of a method for operating the input apparatus 100M3 will be described. As shown in FIG. 13C, the light-shielding walls 170S1 and 170S2 extend in the Y direction and are disposed at the same position in the X direction. The light-shielding walls 170S1 and 170S2 are disposed on the +Y direction side and the −Y direction side of the light-shielding wall 170S3 extending in the X direction. The light-shielding walls 170S1 to 170S3 are disposed in the form of a cross in plan view.

The light-shielding walls 170MH1 to 170MH4 are disposed in the form of a rectangular ring so as to surround the light-shielding walls 170S1 to 170S3 disposed in the form of a cross. Specifically, the light-shielding wall 170MH1 extends in the Y direction on the −X direction side of the light-shielding walls 170S1 to 170S3. The light-shielding wall 170MH2 extends in the Y direction on the +X direction side of the light-shielding walls 170S1 to 170S3. The light-shielding wall 170MH3 extends in the X direction on the +Y direction side of the light-shielding walls 170S1 to 170S3. The light-shielding wall 170MH4 extends in the X direction on the −Y direction side of the light-shielding walls 170S1 to 170S3. In other words, the light-shielding walls 170S1 to 170S3 are disposed between four optical paths (four optical paths corresponding to the four symbols 185A, 185B, 185E, and 185F) surrounded by the light-shielding walls 170MH1 to 170MH4.

The light-shielding walls 170MH1 to 170MH4 are disposed so as to separate the four optical paths (the four optical paths corresponding to the symbols 185A and 185B, 185E, and 185F) together with the light-shielding walls 170S1 to 170S3.

The light-shielding wall 170S4 extends in an oblique direction indicated by the −X direction and the +Y direction along a symbol 185I from an end of the light-shielding wall 170MH3 in the −X direction. The light-shielding wall 170S5 extends in an oblique direction indicated by the +X direction and the +Y direction along the symbol 185I from an end of the light-shielding wall 170MH3 in the +X direction. The light-shielding wall 170S6 extends in an oblique direction indicated by the −X direction and the −Y direction along a symbol 185J from an end of the light-shielding wall 170MH4 in the −X direction. The light-shielding wall 170S7 extends in an oblique direction indicated by the +X direction and the −Y direction along the symbol 185J from an end of the light-shielding wall 170MH4 in the +X direction.

The symbols 185A and 185B and 185E to 185N are displayed on the surface of the skin 180 with the light passing through openings, like the openings 184A and 184G shown in FIG. 14, which are omitted in FIG. 13C. The symbols 185A and 185B and 185E to 185N are individually irradiated with the light from the plurality of LEDs 120. For example, the symbols 185A, 185G, and 185K show emission light changed from white to orange. FIG. 13C illustrates the portions that have changed to orange in textured pattern (fine dots). To change the emission color in this manner, each LED 120 may include two LEDs, a white LED and an orange LED.

The symbols 185A and 185K are entirely irradiated with orange light. The symbol 185G is displayed in the darkest orange at the portion close to the fingertip FT, gradually becomes white with an increasing distance from the fingertip FT, and becomes white at the end on the −Y direction side. The symbol 185G is enabled to gradually change in emission color using a plurality of LEDs 120 capable of emitting white and orange lights in the extending direction (Y direction) of the symbol 185G.

The symbols 185A, 185B, 185E, and 185F are individually irradiated with light in four areas divided by the light-shielding walls 170S1 to 170S3 in the rectangular area surrounded by the light-shielding walls 170MH1 to 170MH4. The symbols 185A, 185B, 185E, and 185F are examples of a first symbol. The symbols 185A 185B, 185E, and 185F represent the left front seat, the right front seat, the left rear seat, and the right rear seat of the vehicle 50, respectively, indicating the positions at which an operation is performed on the skin 180 in selecting the left front seat, the right front seat, the left rear seat, and the right rear seat, respectively.

The symbols 185G and 185N are examples of a second symbol. The symbols 185G and 185H extend in the extending direction (Y direction) of the light-shielding walls 170MH1 and 170MH2, respectively. The symbols 185K and 185L are displayed on the −Y direction side of the symbols 185G and 185H, respectively. The symbols 185K and 185L represent speakers. The symbols 185G and 185H represent the loudness levels of the speakers on the −X direction side (left) and the +X direction (right), respectively.

The optical path 121G corresponding to the symbol 185G is located between the symbol 185G and the LED 120G, as shown in FIG. 14. Since the symbol 185G extends in the Y direction, as shown in FIG. 13C, the LED 120G also extends in the Y direction. The length of the LED 120G in the Y direction is substantially the same as the length of the symbol 185G in the Y direction. The LED 120G has a section extending along the light-shielding wall 170MH1 and outputs light toward the cushion 160. The symbol 185G on the skin 180, irradiated with the light output from the LED 120G and passing through the opening 184G of the mask 184, also has a section extending along the light-shielding wall 170MH1, similarly to the LED 120G. The same applies to the symbol 185H and the LED 120 corresponding to the symbol 185H.

The symbols 185I and 185J are examples of the second symbol. The symbol 185I extends along the light-shielding walls 170MH3, 170S4, and 170S5. The symbol 185J extends along the light-shielding walls 170MH4, 170S6, and 170S7. Portions of the symbols 185I and 185J extending in the X direction extend along the light-shielding walls 170MH3 and 170MH4, respectively. The two LEDs 120 that output light to two optical paths corresponding to the symbols 185I and 185J have the same shapes as those of the symbols 185I and 185J in plan view, and has sections extending in the extending direction (X direction) of the light-shielding walls 170MH3 and 170MH4, respectively. The light-shielding walls 170MH3 and 170MH4 guide the fingertip FT of the user along the sections of the symbols 185I and 185J extending in the X direction.

Symbols 185M and 185N are displayed on the +Y direction side and the −Y direction side of the symbols 185I and 185J, respectively. The symbols 185M and 185N represent the air volume level of the fan (FAN) of the air conditioner of the vehicle 50 and the temperature (TEMP) level of the air conditioner, respectively.

The following description is made on the assumption that the input apparatus 100M3 includes ten optical paths corresponding to the ten symbols 185B, 185E, 185F, and 185H to 185N in addition to the symbols 185A and 185G. The optical paths 121A and 121G corresponding to the symbols 185A and 185G are as shown in FIG. 14. The optical paths corresponding to the symbols 185A, 185B, 185E, and 185F are examples of the first optical path. The optical paths corresponding to the symbols 185G to 185N are examples of the second optical path.

The light-shielding walls 170S1 to 170S3 made of a flexible member optically separate the four optical paths (examples of the first optical path) corresponding to the symbols 185A 185B, 185E, and 185F. The light-shielding walls 170MH1 to 170MH4 are disposed so as to surround the four optical paths (examples of the first optical path) corresponding to the symbols 185A 185B, 185E, and 185F. The light-shielding walls 170MH1 to 170MH4 optically separate the four optical paths (examples of the first optical path) corresponding to the symbols 185A 185B, 185E, and 185F.

The light-shielding walls 170S4 and 170S5 made of a flexible member optically separate the optical path corresponding to the symbol 185I (the second optical path) on the opposite sides of the symbol 185I. Similarly, the light-shielding walls 170S6 and 170S7 optically separate the optical path (the second optical path) corresponding to the symbol 185J on the opposite sides of the symbol 185J.

Figure 15:
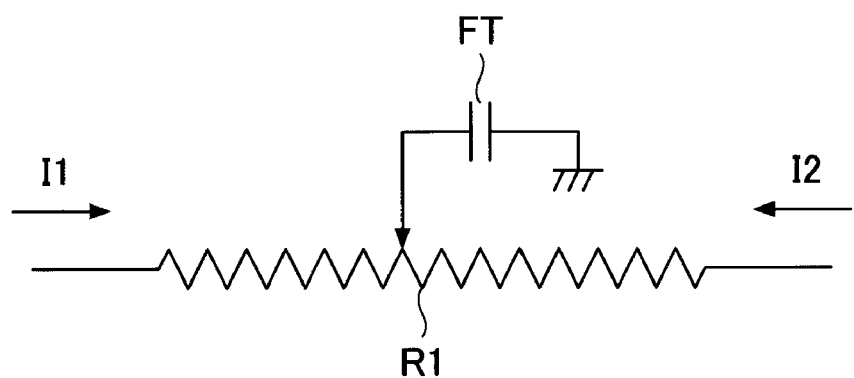
FIG. 15 is a diagram illustrating the principle of position detection performed by an electrostatic sensor.

FIG. 15 is a diagram illustrating the principle of position detection performed by the electrostatic sensor 140M. FIG. 15 illustrates a resistor R1, which is one of a plurality of transparent electrodes of the electrostatic sensor 140M, with which a capacitor corresponding to the fingertip FT is in contact. When the fingertip FT touches the transparent electrode, electric currents I1 and I2 flow from the opposite sides of the transparent electrode toward the fingertip FT. The ratio between the values of the electric currents I1 and I2 changes according to the position from the transparent electrode. This is because the ratio between the resistant values from the opposite ends of the transparent electrode to the position that the fingertip FT touches changes. This allows detection of the position of the fingertip FT touching the skin 180. This also allows detection of the position of an operation for moving the fingertip FT along a long operating unit, such as the light-shielding walls 170MH1 to 170MH4.

The position of proximity to or operation of the fingertip on a symbol displayed on the skin 180 is detected using such an electrostatic sensor 140M. Since the electrostatic sensor 140M is less expensive than touch panels, the cost can be decreased. However, this is illustrative only. Alternatively, a self-capacitance or mutual-capacitance touch panel 140 may include a through-hole similar to the through-hole 141M to calculate the coordinate position of the fingertip on the skin 180.

In the input apparatus 100M3, when the user moves the fingertip FT closer to the symbol 185G, as shown in FIG. 13C, and pushes the skin 180, as shown in FIG. 14, the upper end of the light-shielding wall 170MH1 butts the fingertip FT. At that time, the symbols 185G and 185K change from white to orange. Since the light-shielding wall 170MH1 extends in the Y direction, when the fingertip FT is moved along the light-shielding wall 170MH1 in the Y direction, the position of the fingertip FT is detected by the electrostatic sensor 140M (see FIG. 14), and the symbol 185G is irradiated with light so that the portion where the fingertip FT is located becomes the darkest orange. The upper end of the light-shielding wall 170MH1 serves as a guide that guides the fingertip FT along the symbol 185G. In moving the fingertip FT along the upper end of the light-shielding wall 170MH1, the heightwise position of the fingertip FT with respect to the electrostatic sensor 140M is kept constant, which improves the detection accuracy in detecting the position of the fingertip FT. The same applies to the light-shielding walls 170MH2 to 170MH4.

When the fingertip FT is moved along the light-shielding wall 170MH1 in the Y direction, a portion of the symbol 185G irradiated with the darkest orange light moves following the position of the fingertip FT. Thus, the user can adjust the loudness level of the speaker while checking the irradiation light of the symbol 185G. Moving the fingertip FT along the light-shielding wall 170MH2 in the Y direction also allows the loudness level of the speaker to be adjusted. For example, the symbol 185G is provided for a rear left seat occupant, and the symbol 185H is provided for a rear right seat occupant.

Since the air volume level and the temperature level of the air conditioner can be independently adjusted for the left front seat, the right front seat, the left rear seat, and the right rear seat, any of the symbols 185A 185B, 185E, and 185F may be touched with the fingertip FT in selecting a seat. Of the symbols 185A 185B, 185E, and 185F, a symbol corresponding to the seat selected by the user changes from white to orange.

When the user brings the fingertip FT close to the symbols 185M and 185I, the symbols 185M and 185I change to orange. The user can adjust the air volume level of the air conditioner by moving the fingertip FT in the X direction along the light-shielding wall 170MH3. The symbol 185I is irradiated with light so that a portion at which the fingertip FT is located becomes the darkest orange, as is the symbol 185G.

When the user brings the fingertip FT close to the symbols 185N and 185J, the symbols 185N and the 185J change to orange. The user can adjust the temperature level of the air conditioner by moving the fingertip FT in the X direction along the light-shielding wall 170MH4. The symbol 185J is irradiated with light so that a portion at which the fingertip FT is located becomes the darkest orange, as is the symbol 185G.

Thus, the first light-shielding wall (170S [see FIGS. 1 to 7] and 170S1 to 170S7 [see FIG. 13C]) are provided in the light-transmissive cushion 160 to optically separate the plurality of first optical paths (121A and 121B). This provides the display device (100A) and the input apparatuses (100, 100M1, and 100M3) with the flexible skin 180 and in which the plurality of first optical paths (121A and 121B) is shielded.

Since the first light-shielding walls (170S and 170S1 to 170S7) can be deformed together with the cushion 160, a portion of the skin 180 above the first light-shielding walls (170S and 170S1 to 170S7) can be pushed downward as is a portion where the first light-shielding walls (170S and 170S1 to 170S7) are not present. This allows the optical paths (121A and 121B) to be separated even under downward pressure.

Since the first light-shielding walls (170S and 170S1 to 170S7) are made of a light-shielding fabric, the interior of the transparent plate 150 and the cushion 160 can be separated to have the plurality of first optical paths (121A and 121B), and the deformable cushion 160 including the plurality of first optical paths (121A and 121B) can be provided. The first light-shielding walls (170S and 170S1 to 170S7) can easily be produced by inserting the fabric of the first light-shielding walls (170S and 170S1 to 170S7) into the slits 161 of the cushion 160.

Since the first light-shielding walls (170S and 170S1 to 170S7) have the same or higher flexibility than the flexibility of the cushion 160, the interior of the cushion 160 can be separated to have the plurality of first optical paths (121A and 121B) while keeping the flexibility of the cushion 160.

At least part of the first light-shielding walls (170S and 170S1 to 170S7) is disposed in the slits of the cushion 160. This facilitates positioning of the first light-shielding walls (170S and 170S1 to 170S7) in the cushion 160, allowing stable use of the plurality of first optical paths (121A and 121B) for a long period of time. Disposing the first light-shielding walls 170S1 to 170S3 in an area without the second light-shielding walls 170MH1 to 170MH4 harder than the cushion 160 causes no noticeable difference in touch even when a finger is slid while the area is being pushed, enabling usage like a touchpad.

Since the input apparatuses (100, 100M1, 100M2, and 100M3) include the second light-shielding wall (170H [see FIG. 10], 170MH [see FIGS. 11 and 12], or 170MH1 to 170MH4 [see FIG. 13C]) at least part of which is disposed in the cushion 160 or 160M and having hardness higher than the hardness of the cushion 160 or 160M, a protrusion can be provided in the cushion 160 or 160M. This allows providing the input apparatuses (100, 100M1, 100M2, and 100M3) that allow the user to perceive the second light-shielding walls (170H, 170MH, or 170MH1 to 170MH4) with the fingertip FT.

The second light-shielding walls (170MH1 to 170MH4) are disposed around the plurality of first optical paths (121A and 121B). This allows protrusions to be provided around the plurality of first optical paths (121A and 121B) in the cushion 160, thereby providing the input apparatus (100M3) that allows the user to perceive the area surrounded by the second light-shielding walls (170MH1 to 170MH4) with the fingertip FT.

The second light-shielding walls (170MH1 to 170MH4) are disposed to separate the plurality of first optical paths (121A and 121B) together with the first light-shielding walls (170S1 to 170S3). Thus, the plurality of first optical paths (121A and 121B) can be separated by the combination of the soft first light-shielding walls (170S1 to 170S3) and the hard second light-shielding walls (170MH1 to 170MH4). The first light-shielding walls (170S1 to 170S3) are disposed at positions where no protrusion is present around the first optical paths (121A and 121B) in the cushion 160. The second light-shielding walls (170MH1 to 170MH4) are disposed at positions where protrusions are present around the plurality of first optical paths (121A and 121B) in the cushion 160. This allows the positions where the protrusions are present around the plurality of first optical paths (121A and 121B) and the position where no protrusion is present to be freely combined to provide various patterns in which a protrusion is present or not around the plurality of first optical paths (121A and 121B).

The first light-shielding walls (170S1 to 170S3) are disposed between the plurality of first optical paths (121A and 121B) surrounded by the second light-shielding walls (170MH1 to 170MH4). This provides the input apparatus (100M3) in which the skin 180 at a portion inside the second light-shielding walls (170MH1 to 170MH4) where the plurality of first optical paths (121A and 121B) is present is soft and the skin 180 at portions where the second light-shielding walls (170MH1 to 170MH4) are present is hard.

Since the upper end of the second light-shielding wall (170H) is exposed to the upper surface of the cushion 160, a hard portion can be sensed by touching a portion of the skin 180 above the second light-shielding wall (170H), although the hard portion cannot be perceived on the skin 180. When the user pushes down a portion of the skin 180 above the second light-shielding wall (170H) with the fingertip FT, the fingertip FT can be guided along the second light-shielding wall (170H). Setting the height of the second light-shielding wall (170H) in the Z direction constant in the extending direction (Y direction) allows the interval from the electrostatic sensor 140 to be kept constant in guiding the fingertip FT in the extending direction (Y direction), allowing stable detection with the electrostatic sensor 140.

Since the upper ends of the second light-shielding walls (170MH and 170MH1 to 170MH4) are off to the lower surface from the upper surface of the cushion 160, no protrusion is found on the skin 180. However, pushing portions of the skin 180 above the second light-shielding walls (170MH and 170MH1 to 170MH4) provides a touch of a hard protrusion. When the user pushes down portions of the skin 180 above the second light-shielding walls (170H and 170MH1 to 170MH4) with the fingertip FT, the fingertip FT can be guided along the second light-shielding wall (170H). Setting the height of the second light-shielding walls (170H and 170MH1 to 170MH4) in the Z direction constant in the extending direction allows the interval from the electrostatic sensor 140M to be kept constant in guiding the fingertip FT in the extending direction, enabling stable detection with the electrostatic sensor 140M.

The cushion 160 includes the second slit (162) passing between the upper surface and the lower surface, and at least part of the second light-shielding wall (170H) is disposed in the second slit (162). This facilitates positioning of the second light-shielding wall (170H), allowing stable use of the second light-shielding wall (170H) for a long period of time.

The second light source (LED 120G) is disposed below the cushion 160. The second light source (LED 120G) has a portion extending in the extending direction of the second light-shielding wall (170MH1) in plan view and outputs light toward the cushion 160. The skin 180 has a second transmission area (184G) that transmits the light output from the second light source (LED 120G) and passing through the cushion 160 as light of the shape of the second symbol (185G) in plan view. The second transmission area (184G) has a section extending in the extending direction of the light-shielding wall 170MH1 in plan view. This allows an operation along the second symbol (185G) by guiding the fingertip FT along the extending direction of the light-shielding wall 170MH1, improving the operability using a symbol for level adjustment. Setting the height of the second light-shielding wall (170MH1) in the Z direction constant in the extending direction allows the interval from the electrostatic sensor 140M to be kept constant in guiding the fingertip FT along the extending direction, allowing stable detection with the electrostatic sensor 140M. The same applies to the light-shielding walls 170MH2 to 170MH4.

The third light-shielding wall (170SB) at least part of which is disposed in the cushion 160 is provided. The third light-shielding wall (170SB) separates the plurality of first optical paths (121A and 121B) together with the first light-shielding wall (170SA), constitutes a double wall with the first light-shielding wall (170SA), and can be deformed with the cushion 160. This configuration improves the effect of light shielding between the plurality of first optical paths (121A and 121B) using the double wall. This configuration improves the visibility of the plurality of first symbols (185A and 185B) irradiated with light through the plurality of first optical paths (121A and 121B).

The third light-shielding wall (170SB) is a light-shielding fabric. This allows the interior of the transparent plate 150 and the cushion 160 to be separated into the plurality of first optical paths (121A and 121B) together with the first light-shielding wall (170SA), thereby providing the deformable cushion 160 including the plurality of first optical paths (121A and 121B).

The third light-shielding wall (170SB) has the same or higher flexibility than the flexibility of the cushion 160. This allows the interior of the cushion 160 to be separated into the plurality of first optical paths (121A and 121B) together with the first light-shielding wall (170SA) while keeping the flexibility of the cushion 160.

The cushion 160 includes the third slit (161B) passing between the lower surface and the upper surface, and at least part of the third light-shielding wall (170SB) is disposed in the third slit (161B). This facilitates positioning of the third light-shielding wall (170SB) in the cushion 160, allowing the plurality of first optical paths (121A and 121B) to be stably used for a long period of time.

The input apparatus (100) includes the light-transmissive transparent plate 150 disposed between the cushion 160 and the first light source (LED 120) to hold the lower surface of the cushion 160. This allows the soft cushion 160 to be held with stability, enabling the cushion 160 to be suitably operated for a long period of time. The reinforcement of the cushion 160 allows the orientation of the entire input apparatus (100) to be held for a long period of time.

Since the lower end of the light-shielding wall 170S is housed in the first groove (151) of the transparent plate 150, the lower end of the light-shielding wall 170S can be disposed at the stable portion, allowing the light-shielding wall 170S to be positioned for a long period of time.

The lower end of the light-shielding wall 170S is firmly fixed to the transparent plate 150 in the first groove (151) with the adhesive 171. This configuration allows the lower end of the first light-shielding wall (170S) to be stably fixed, allowing the first light-shielding wall (170S) to be positioned in the transparent plate 150 and the cushion 160 for a long period of time.

The light-transmissive transparent plate 150 disposed between the cushion 160 and the first light source (120)

holds the lower surface of the cushion 160. The lower end of the second light-shielding wall (170H or 170MH1 to 170MH4) is housed in the through-hole (152 or 153) or the second groove of the transparent plate 150. This configuration allows the soft cushion 160 to be stably held, allowing the cushion 160 to be suitably operated for a long period of time. The reinforcement of the cushion 160 allows the orientation of the entire input apparatus 100 to be held for a long period of time. This configuration allows the lower end of the second light-shielding wall (170H or 170MH1 to 170MH4) to be disposed at the stable portion, allowing the second light-shielding wall (170H or 170MH1 to 170MH4) to be positioned for a long period of time.

The input apparatus (100) includes the light-transmissive transparent plate 150 disposed between the cushion 160 and the first light sources (120A and 120B) to hold the lower surface of the cushion 160. The lower end of the third light-shielding wall (170SB) is housed in the third groove (151B) of the transparent plate 150. This configuration allows the soft cushion 160 to be stably held, allowing the cushion 160 to be suitably operated for a long period of time. The reinforcement of the cushion 160 allows the orientation of the entire input apparatus (100) to be held for a long period of time.

The lower end of the third light-shielding wall (170SB) is firmly fixed to the transparent plate 150 in the third groove (151B) with the adhesive 171. This configuration allows the lower end of the third light-shielding wall (170SB) to be stably fixed, allowing the third light-shielding wall (170SB) to be positioned in the transparent plate 150 and the cushion 160 for a long period of time.

The input apparatuses (100 and 100M3) include the display device (100A) including the transparent plate 150 that holds the cushion 160 including the first light-shielding wall (170S) and the electrostatic sensor 140 that is disposed on the opposite side of the transparent plate 150 from the side on which the cushion 160 is held and that detects an operation on the skin 180. This configuration allows the input apparatuses (100 and 100M3) to detect a position of the skin 180 to which the fingertip FT comes close for operation and to receive the operation.

The case 130 disposed on the opposite side of the electrostatic sensor 140 from the transparent plate 150 includes the plurality of first through-holes (131A and 131B) provided in correspondence with the plurality of first optical paths (121A and 121B) in plan view and passing through the plurality of first optical paths (121A and 121B) in the extending direction. The plurality of first light sources (LEDs 120A and 120B) is housed in the plurality of first through-holes (131A and 131B), respectively. This configuration allows accurate positioning of the plurality of first optical paths (121A and 121B) and the plurality of first light sources (LEDs 120A and 120B), thereby allowing stable light irradiation for a long period of time.

The first light-shielding wall (170S) is disposed in an area in which the first wall (135A) between the plurality of first through-holes (131A and 131B) of the case 130 in plan view is located. This configuration allows the plurality of first symbols (185A and 185B) to be stably irradiated with light using the plurality of first light sources (LEDs 120A and 120B) without the plurality of first optical paths (121A and 121B) blocked by the first light-shielding wall (170S).

The input apparatus includes the display device (100A) including the second light-shielding wall (170H), the electrostatic sensor 140 disposed on the opposite side of the transparent plate 150 from the side on which the cushion 160 is held and detecting an operation on the skin 180, and the case 130 disposed on the opposite side of the electrostatic sensor 140 from the transparent plate 150. The case 130 includes the second through-holes (131C and 131D) passing therethrough in the extending direction of the second optical paths (121C and 121D) between the second light sources (120C and 120D) and the second transmission area (184C, 184D) in plan view. The second light sources (120C and 120D) are housed in the second through-holes (131C and 131D), respectively. This allows the plurality of second optical paths (121C and 121D) and the plurality of second light sources (LEDs 120C and 120D) to be accurately positioned using the case 130, enabling stable light irradiation for a long period of time.

The second light-shielding wall (170MH1) is disposed in an area in which the second wall (135G) around the second through-hole (131G) of the case 130 in plan view is located. This configuration allows the second symbol (185G) to be stably irradiated with light by the second light source (LED 120G) without blocking the second optical path (121G) with the second light-shielding wall (170MH1).

The second light-shielding wall (170H) is integrated with the transparent plate 150 using two-color molding, passes through the through-hole (152) of the transparent plate 150, and protrudes from the transparent plate 150 toward the skin 180. This configuration allows the second light-shielding wall (170H) and the transparent plate 150 to be integrally formed using two-color molding, thereby reducing the number of processes in manufacturing to facilitate the manufacture. This configuration improves the accuracy of positioning the transparent plate 150 and the second light-shielding wall (170H), allowing the second optical paths (121C and 121D) to be stably provided.

The capacitive detection electrode (140M) includes the through-hole (141M). The second light-shielding wall (170MH) is part of the second wall (135B) around the second through-holes (131C and 131D) of the base (130) extending toward the skin (180) through the through-hole (141M) of the capacitive detection electrode (140M). This configuration allows the base (130) and the second light-shielding wall (170MH) to be integrally formed, reducing the number of processes in manufacturing to facilitate the manufacture. This configuration improves the accuracy of positioning the base (130) and the second light-shielding wall (170MH), allowing the second optical paths (121C and 121D) to be stably provided.

The electrostatic sensor 140M includes the through-hole (141M). The second light-shielding wall (170MH1) is part of the second wall (135G) around the second through-hole (131G) of the case 130 extending toward the skin 180 through the through-hole 141M of the electrostatic sensor 140M. Providing the through-hole 141M in the electrostatic sensor 140M and passing the second light-shielding wall (170MH1) therethrough increases the flexibility of designing.

The second light-shielding wall (170MH1) has a wedge-shaped cross section in which the width in a cross section perpendicular to the extending direction decreases from the bottom of the cushion 160 to the top. This configuration has the advantage of facilitating inserting the second light-shielding wall (170MH1) into the second slit (162M) and closing a portion of the second slit (162M) above the upper end of the second light-shielding wall (170MH1).

The input apparatus further includes the substrate 110 which is provided on the opposite side of the case 130 from the electrostatic sensor 140, and on which the second light sources (120C and 120D) are mounted. This configuration allows the second light sources (120C and 120D) to be mounted at the lower part of the case 130 and provides wiring lines to be connected to the second light sources (120C and 120D).

The input apparatus includes the display device (100A) including the third light-shielding wall (170SB), the electrostatic sensor 140 disposed on the opposite side of the transparent plate 150 from the cushion 160 and detecting an operation on the skin 180, and the case 130 disposed on the opposite side of the electrostatic sensor 140 from the transparent plate 150. The case 130 includes the plurality of first through-holes (131A and 131B) passing therethrough in the extending direction of the plurality of first optical paths (121A and 121B) disposed in correspondence with the first optical paths (121A and 121B) in plan view. The first light sources (120A and 120B) are housed in the first through-holes (131A and 131B), respectively. This allows the plurality of first optical paths (121A and 121B) and the plurality of first light sources (LEDs 120A and 120B) to be accurately positioned using the case 130, enabling stable light irradiation for a long period of time.

The first light-shielding wall (170SA) and the third light-shielding wall (170SB) are disposed in an area in which the first wall (135A) between the plurality of first through-holes (131A and 131B) of the case 130 in plan view is located. This configuration allows the plurality of first symbols (185A and 185B) to be stably irradiated with light by the plurality of first light sources (LEDs 120A and 120B) without blocking the first optical paths (121A and 121B) with the first light-shielding wall (170SA) and the third light-shielding wall (170SB).

The input apparatus further includes the substrate 110 which is provided on the opposite side of the case 130 from the electrostatic sensor 140, and on which the first light sources (120A and 120B) are mounted. In the configuration including the third light-shielding wall (170SB), the first light sources (120A and 120B) can be mounted at the lower part of the case 130, and wiring lines to be connected to the second light sources (120C and 120D) can be disposed.

In the above embodiments, the cushion 160 made of a light-transmissive flexible member includes the first light-shielding wall (170S and so on) made of a fabric. Alternatively, the light-transmissive flexible member serving as the cushion 160 may be made of rubber. In this case, the first light-shielding wall (170S and so on) may also be made of rubber. The rubber cushion 160 and the rubber first light-shielding wall (170S and so on) may be produced using two-color molding.

While the display devices and the input apparatuses according to exemplary embodiments of the present invention have been described, it is to be understood that the present invention is not limited to the specific disclosed embodiments and that various modifications and changes may be made without departing from the scope of the claims.

What is claimed is:
1. A display device comprising:
a cushion having a light-transmissive property;
a plurality of first light sources disposed on a side of a first surface of the cushion, the first light sources outputting light toward the cushion;
a skin disposed on a side of a second surface of the cushion opposite from the first surface to cover the cushion, the skin being on an outer surface of the display device, the skin including a plurality of first transmission areas that transmit the light output from the plurality of first light sources and passing through the cushion as light representing shapes of a plurality of first symbols in a plan view;
a first light-shielding wall at least part of which is disposed in the cushion, the first light-shielding wall separating a plurality of first optical paths extending from the plurality of first light sources to the plurality of first transmission areas; and
a transparent plate-like member having a light-transmissive property, the transparent plate-like member being disposed between the cushion and the first light source to hold the first surface of the cushion.
2. The display device according to claim 1, wherein the first light-shielding wall is deformable together with the cushion.
3. The display device according to claim 1, wherein the first light-shielding wall comprises a fabric having a light-shielding property.
4. The display device according to claim 1, wherein the first light-shielding wall has equal or higher flexibility than flexibility of the cushion.
5. The display device according to claim 1,
wherein the cushion includes a first slit passing between the first surface and the second surface; and
wherein the at least part of the first light-shielding wall is disposed in the first slit.
6. The display device according to claim 1, further comprising a second light-shielding wall at least part of which is disposed in the cushion, the second light-shielding wall having hardness higher than hardness of the cushion.
7. The display device according to claim 6, wherein the second light-shielding wall is disposed so as to surround the plurality of first optical paths or separate the plurality of first optical paths together with the first light-shielding wall.
8. The display device according to claim 7, wherein the first light-shielding wall is disposed between the plurality of first optical paths surrounded by the second light-shielding wall.
9. The display device according to claim 6, wherein an end of the second light-shielding wall on a side of the second surface is exposed to the second surface of the cushion.
10. The display device according to claim 6, wherein an end of the second light-shielding wall on a side of the second surface is off to the first surface relative to the second surface of the cushion.
11. The display device according to claim 6,
wherein the cushion includes a second slit passing between the first surface and the second surface, and
wherein the at least part of the second light-shielding wall is disposed in the second slit.
12. The display device according to claim 6, further comprising:
a second light source disposed on a side of the first surface of the cushion along an extending direction of the second light-shielding wall in the plan view, the second light source outputting light toward the cushion,
wherein the skin includes a second transmission area that transmits the light output from the second light source and passing through the cushion as light representing a shape of a second symbol in the plan view, and
wherein the second transmission area is disposed along an extending direction of the second light-shielding wall in the plan view.
13. The display device according to claim 1, further comprising a third light-shielding wall at least part of which is disposed in the cushion, the third light-shielding wall separating the plurality of first optical paths from each other together with the first light-shielding wall, constituting a double or more wall together with the first light-shielding wall, being deformable together with the cushion.

14. The display device according to claim 13, wherein the third light-shielding wall comprises a fabric having a light-shielding property.

15. The display device according to claim 13, wherein the third light-shielding wall has equal or higher flexibility than flexibility of the cushion.

16. The display device according to claim 13,
wherein the cushion includes a third slit passing between the first surface and the second surface; and
wherein the at least part of the third light-shielding wall is disposed in the third slit.

17. The display device according to claim 1, wherein an end of the first light-shielding wall on a side of the first light source is housed in a first groove of the transparent plate-like member.

18. The display device according to claim 17, wherein the end of the first light-shielding wall on a side of the first light source is firmly fixed to the transparent plate-like member in the first groove.

19. The display device according to claim 6,
wherein an end of the second light-shielding wall on a side of the first light source is housed in a through-hole or a second groove of the transparent plate-like member.

20. The display device according to claim 13,
wherein an end of the third light-shielding wall on a side of the first light source is housed in a third groove of the transparent plate-like member.

21. The display device according to claim 20, wherein the end of the third light-shielding wall on a side of the first light source is firmly fixed to the transparent plate-like member in the third groove.

22. An input apparatus comprising:
the display device according to claim 1; and
a capacitive detection electrode disposed on the transparent plate-like member, the capacitive detection electrode detecting an operation on the skin.

23. The input apparatus according to claim 22, wherein the capacitive detection electrode is disposed on an opposite side of the transparent plate-like member from a side on which the cushion is held.

24. The input apparatus according to claim 23, further comprising:
a base disposed on an opposite side of the capacitive detection electrode from the transparent plate-like member, the base including a plurality of first through-holes provided individually in correspondence with the plurality of first optical paths in the plan view, the first through-holes passing in extending directions of the plurality of first optical paths,
wherein the plurality of first light sources is individually housed in the plurality of first through-holes.

25. The input apparatus according to claim 24, wherein the first light-shielding wall is disposed in an area in which a first wall between the plurality of first through-holes of the base in the plan view is located.

26. An input apparatus comprising:
the dislay device according to claim 12;
a capacitive detection electrode disposed on an opposite side of the transparent plate-like member from a side on which the cushion is held, the capacitive detection electrode detecting an operation on the skin; and
a base disposed on an opposite side of the capacitive detection electrode from the transparent plate-like member, the base including a second through-hole passing in an extending directions of a second optical path between the second light source and the second transmission area in the plan view,
wherein an end of the second light-shielding wall on a side of the first light source is disposed in a through-hole or a second groove of the transparent plate-like member, and
wherein the second light source is housed in the second through-hole.

27. The input apparatus according to claim 26, wherein the second light-shielding wall is disposed in an area in which a second wall located around the second through-hole of the base in the plan view is located.

28. The input apparatus according to claim 26, wherein the second light-shielding wall is a portion integrally formed with the transparent plate-like member by using two-color molding, passing through the through-hole of the transparent plate-like member, and protruding from the transparent plate-like member toward the skin.

29. The input apparatus according to claim 26,
wherein the capacitive detection electrode includes a through-hole, and
wherein the second light-shielding wall is part of the second wall located around the second through-hole of the base, the part passing through the through-hole of the capacitive detection electrode and extending toward the skin.

30. The input apparatus according to claim 29, wherein the second light-shielding wall has a wedge-shaped cross section in which a width in a cross section perpendicular to the extending direction decreases from the first surface of the cushion to the second surface.

31. The input apparatus according to claim 26, further comprising a substrate disposed on an opposite side of the base from the capacitive detection electrode, wherein the second light source is mounted on the substrate.

32. An input apparatus comprising:
the display device according to claim 21;
a capacitive detection electrode disposed on an opposite side of the transparent plate-like member from a side on which the cushion is held, the capacitive detection electrode detecting an operation on the skin; and
a base disposed on an opposite side of the capacitive detection electrode from the transparent plate-like member, the base including a plurality of first through-holes provided individually in correspondence with the plurality of first optical paths in the plan view, the first through-holes passing in extending directions of the plurality of first optical paths,
wherein the plurality of first light sources is individually housed in the plurality of first through-holes.

33. The input apparatus according to claim 32, wherein the first light-shielding wall and the third light-shielding wall are disposed in an area in which a first wall between the plurality of first through-holes of the base in the plan view is located.

34. The input apparatus according to claim 24, further comprising a substrate disposed on an opposite side of the base from the capacitive detection electrode, wherein the plurality of first light sources is mounted on the substrate.

35. A display device comprising:
a cushion having a light-transmissive property;
a plurality of first light sources disposed on a side of a first surface of the cushion, the first light sources outputting light toward the cushion;
a skin disposed on a side of a second surface of the cushion opposite from the first surface to cover the cushion, the skin being on an outer surface of the display device, the skin including a plurality of first transmission areas that transmit the light output from the plurality of first light sources and passing through the cushion as light representing shapes of a plurality of first symbols in a plan view;
- a first light-shielding wall at least part of which is disposed in the cushion, the first light-shielding wall separating a plurality of first optical paths extending from the plurality of first light sources to the plurality of first transmission areas; and
- a second light-shielding wall at least part of which is disposed in the cushion, the second light-shielding wall having hardness higher than hardness of the cushion,
- wherein an end of the second light-shielding wall on a side of the second surface is exposed to the second surface of the cushion.

36. A display device comprising:
a cushion having a light-transmissive property;
a plurality of first light sources disposed on a side of a first surface of the cushion, the first light sources outputting light toward the cushion;
a skin disposed on a side of a second surface of the cushion opposite from the first surface to cover the cushion, the skin being on an outer surface of the display device, the skin including a plurality of first transmission areas that transmit the light output from the plurality of first light sources and passing through the cushion as light representing shapes of a plurality of first symbols in a plan view;
- a first light-shielding wall at least part of which is disposed in the cushion, the first light-shielding wall separating a plurality of first optical paths extending from the plurality of first light sources to the plurality of first transmission areas; and
- another light-shielding wall at least part of which is disposed in the cushion, the another light-shielding wall separating the plurality of first optical paths from each other together with the first light-shielding wall, constituting a double or more wall together with the first light-shielding wall, being deformable together with the cushion,
- wherein the cushion includes a slit passing between the first surface and the second surface; and
- the at least part of the another light-shielding wall is disposed in the slit.

* * * * *